(12) United States Patent
Kusashima et al.

(10) Patent No.: US 11,405,811 B2
(45) Date of Patent: Aug. 2, 2022

(54) COMMUNICATION APPARATUS AND COMMUNICATION METHOD

(71) Applicant: SONY CORPORATION, Tokyo (JP)

(72) Inventors: Naoki Kusashima, Kanagawa (JP); Ryota Kimura, Tokyo (JP); Kazuyuki Shimezawa, Kanagawa (JP); Ryo Sawai, Tokyo (JP); Hiroto Kuriki, Kyoto (JP); Keiichi Mizutani, Kyoto (JP); Takeshi Matsumura, Kyoto (JP); Hiroshi Harada, Kyoto (JP)

(73) Assignee: SONY CORPORATION, Tokyo (JP)

( * ) Notice: Subject to any disclaimer, the term of this patent is extended or adjusted under 35 U.S.C. 154(b) by 92 days.

(21) Appl. No.: 16/960,241

(22) PCT Filed: Nov. 30, 2018

(86) PCT No.: PCT/JP2018/044323
§ 371 (c)(1),
(2) Date: Jul. 6, 2020

(87) PCT Pub. No.: WO2019/142512
PCT Pub. Date: Jul. 25, 2019

(65) Prior Publication Data
US 2021/0067992 A1 Mar. 4, 2021

(30) Foreign Application Priority Data
Jan. 16, 2018 (JP) .............................. JP2018-005230

(51) Int. Cl.
H04W 24/10 (2009.01)
H04W 52/28 (2009.01)
(Continued)

(52) U.S. Cl.
CPC ............ *H04W 24/10* (2013.01); *H04B 17/24* (2015.01); *H04B 17/345* (2015.01); *H04L 5/0053* (2013.01); *H04L 5/14* (2013.01)

(58) Field of Classification Search
CPC ..... H04W 24/10; H04W 92/18; H04W 24/08; H04W 52/247; H04B 17/24; H04B 17/345; H04L 5/0073
See application file for complete search history.

(56) References Cited

U.S. PATENT DOCUMENTS

2009/0286562 A1* 11/2009 Gorokhov ............ H04B 7/0617
455/501
2011/0044275 A1* 2/2011 Ishii .................... H04W 52/325
370/329
(Continued)

FOREIGN PATENT DOCUMENTS

CA 2950160 A1 12/2015
CN 103458420 A 12/2013
(Continued)

OTHER PUBLICATIONS

International Search Report and Written Opinion of PCT Application No. PCT/JP2018/044323, dated Feb. 19, 2019, 09 pages of ISRWO.

*Primary Examiner* — Diane L Lo
*Assistant Examiner* — Abusayeed M Haque
(74) *Attorney, Agent, or Firm* — Chip Law Group

(57) ABSTRACT

Provided are a communication apparatus that is operated under a wireless communication environment to which a full duplex communication scheme is applied and a communication method. The communication apparatus includes a communication section that performs wireless communication and a control section that controls operation of the communication section and processing of a signal transmitted and received by the communication section. Upon (Continued)

receiving, through a downlink control channel from a base station, designation regarding a resource in which interference is to be measured, the control section conducts, in the designated resource, measurement of interference from another terminal. In addition, the control section further controls transmission of interference information obtained by the measurement to the base station.

35 Claims, 9 Drawing Sheets

(51) Int. Cl.
  *H04B 17/24* (2015.01)
  *H04B 17/345* (2015.01)
  *H04L 5/00* (2006.01)
  *H04W 52/14* (2009.01)
  *H04L 5/14* (2006.01)

(56) References Cited

U.S. PATENT DOCUMENTS

| | | | | |
|---|---|---|---|---|
| 2014/0064233 | A1* | 3/2014 | Oizumi | H04L 5/001 370/329 |
| 2014/0321313 | A1* | 10/2014 | Seo | H04J 11/00 370/252 |
| 2015/0085805 | A1 | 3/2015 | Li et al. | |
| 2015/0215903 | A1* | 7/2015 | Zhao | H04W 72/082 370/329 |
| 2015/0319633 | A1* | 11/2015 | Ji | H04W 24/10 370/252 |
| 2015/0319796 | A1* | 11/2015 | Lu | H04W 74/02 370/330 |
| 2015/0382375 | A1 | 12/2015 | Bhushan et al. | |
| 2016/0329981 | A1* | 11/2016 | Chung | H04W 72/0446 |
| 2017/0026939 | A1* | 1/2017 | Fodor | H04L 5/0073 |
| 2019/0028978 | A1* | 1/2019 | Yasukawa | H04W 4/70 |
| 2020/0128436 | A1* | 4/2020 | Chae | H04W 72/1284 |
| 2021/0112503 | A1* | 4/2021 | Zhang | H04W 52/243 |

FOREIGN PATENT DOCUMENTS

| | | |
|---|---|---|
| CN | 106465399 A | 2/2017 |
| EP | 2858398 A1 | 4/2015 |
| EP | 3162144 A1 | 5/2017 |
| JP | 2017-523687 A | 8/2017 |
| JP | 2017-523687 A1 | 8/2017 |
| KR | 10-2017-0020813 A | 2/2017 |
| WO | 2013/178084 A1 | 12/2013 |
| WO | 2015/098228 A1 | 7/2015 |
| WO | 2015/199942 A1 | 12/2015 |

* cited by examiner

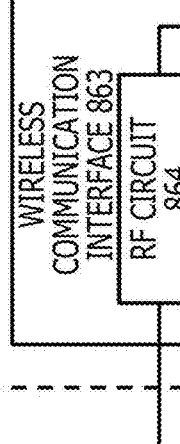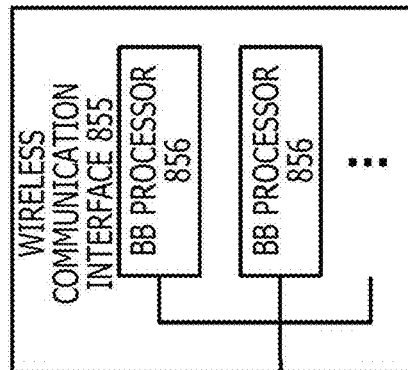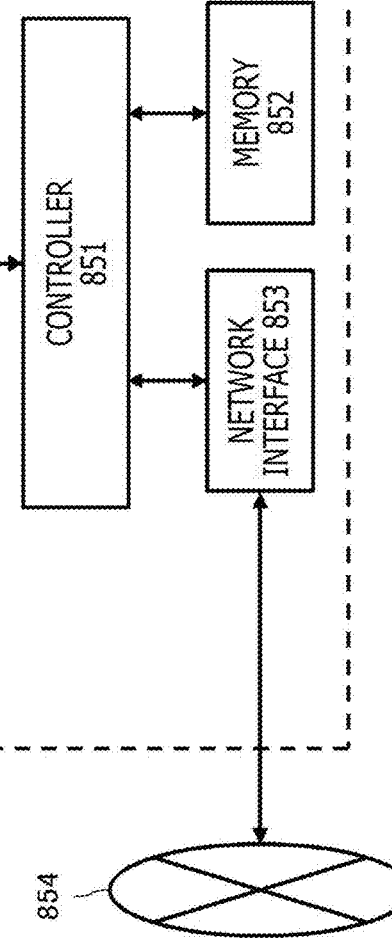
FIG. 9

COMMUNICATION APPARATUS AND COMMUNICATION METHOD

CROSS REFERENCE TO RELATED APPLICATIONS

This application is a U.S. National Phase of International Patent Application No. PCT/JP2018/044323 filed on Nov. 30, 2018, which claims priority benefit of Japanese Patent Application No. JP 2018-005230 filed in the Japan Patent Office on Jan. 16, 2018. Each of the above-referenced applications is hereby incorporated herein by reference in its entirety.

TECHNICAL FIELD

The technology disclosed herein relates to a communication apparatus that is operated under a wireless communication environment to which a full duplex communication scheme is applied and a communication method.

BACKGROUND ART

Due to the rapid increase in mobile data traffic in recent years, study on innovative technologies for enhancing the use efficiency of radio resources is actively carried out. A representative one of these technologies is full duplex (FD) communication. For example, a technology for implementing, at a communication apparatus (mainly, a relay station), FD of an access link (between the relay station and terminals) and a backhaul link (between a base station and the relay station) is disclosed (see PTL 1, for example).

In conventional FD, communication in which a transmission band and a reception band use different frequencies is commonly carried out in order to avoid crosstalk between a transmission signal and a reception signal. Conventional FD (which uses different frequencies) is also called "FD FDD (Frequency Division DUplex)." Meanwhile, in Band full duplex (IB FD) is a duplex scheme in which transmission and reception are concurrently performed by using the same band. IB FD can enhance the frequency use efficiency to be up to twice that of conventional FD FDD (i.e., FDD in which a transmission band and a reception band use different frequencies).

IB FD has a problem that a signal transmitted from a communication apparatus may be leaked to a reception circuit of the communication apparatus so that significantly strong self-interference is generated. Recently, such self-interference can be mitigated as a result of the advancement of interference cancelling technology. Consequently, carrying out IB FD is becoming possible.

CITATION LIST

Patent Literature

[PTL 1]
  WO2015/098228

SUMMARY

Technical Problem

An object of the technology disclosed herein is to provide a communication apparatus that is operated under a wireless communication environment to which a full duplex communication scheme is applied and a communication method.

Solution to Problem

A first aspect of the technology disclosed herein is a communication apparatus including
  a communication section that performs wireless communication, and
  a control section that controls operation of the communication section and processing of a signal transmitted and received by the communication section, in which
  upon receiving, through a downlink control channel from a base station, designation regarding a resource in which interference is to be measured, the control section conducts, in the designated resource, measurement of interference from another terminal.

The control section conducts measurement of interference in a downlink resource that is semi-statically designated as a downlink but is dynamically designated as an uplink while any resource with which full duplex communication is to be carried out is not dynamically designated. Alternatively, the control section conducts measurement of interference in a downlink resource that is semi-statically designated as an uplink but is dynamically designated as an uplink while any resource with which full duplex communication is to be carried out is not dynamically designated. In addition, the control section further controls transmission of interference information obtained by the measurement to the base station.

Further, a second aspect of the technology disclosed herein is a communication apparatus including
  a communication section that performs wireless communication, and
  a control section that controls operation of the communication section and processing of a signal transmitted and received by the communication section, in which
  upon receiving, through a downlink control channel from a base station, designation regarding a resource in which interference is to be measured, the control section conducts, in the designated resource, transmission of a test signal for interference measurement.

The control section conducts transmission of a test signal for interference measurement in a downlink resource that is semi-statically designated as a downlink but is dynamically designated as an uplink while any resource with which full duplex communication is to be carried out is not dynamically designated. Alternatively, the control section conducts transmission of a test signal for interference measurement in a downlink resource that is semi-statically designated as an uplink but is dynamically designated as an uplink while any resource with which full duplex communication is to be carried out is not dynamically designated.

Further, a third aspect of the technology disclosed herein is a communication apparatus including
  a communication section that performs wireless communication, and
  a control section that controls operation of the communication section and processing of a signal transmitted and received by the communication section, in which
  the control section makes, through a downlink control channel, designation regarding a resource in which interference is to be measured, for a downlink terminal that is slated to transmit a downlink signal.

In addition, the control section makes, through a downlink control channel, designation regarding a resource in which a test signal for interference measurement is to be transmitted, for an uplink terminal that is slated to transmit an uplink signal. Further, the control section decides, on the basis of interference measurement result obtained by a downlink terminal, a combination of a downlink terminal to be set as a transmission destination of a downlink signal and an uplink terminal to transmit an uplink signal in the resource for which the instruction for interference measurement has been given through the downlink control channel.

Moreover, a fourth aspect of the technology disclosed herein is a communication method including a step of receiving, through a downlink control channel from a base station, designation regarding a resource in which interference is to be measured, and a step of conducting measurement of interference from another terminal in the designated resource.

Further, a fifth aspect of the technology disclosed herein is a communication method including a step of receiving, through a downlink control channel from a base station, designation regarding a resource in which interference is to be measured, and a step of transmitting a test signal for interference measurement from another terminal in the designated resource.

Furthermore, a sixth aspect of the technology disclosed herein is a communication method including a step of transmitting, through a downlink control channel to a downlink terminal that is slated to transmit a downlink signal, designation regarding a resource in which interference is to be measured, a step of transmitting, through the downlink control channel to an uplink terminal that is slated to transmit an uplink signal, designation regarding a resource in which a test signal for interference measurement is to be transmitted, and a step of deciding, on the basis of an interference measurement result obtained by the downlink terminal, a combination of a downlink terminal to be set as a transmission destination of a downlink signal and an uplink terminal to transmit an uplink signal in the resource for which an instruction for measurement interference has been given through the downlink control channel.

Advantageous Effects of Invention

The technology disclosed herein can provide a communication apparatus and communication method for conducting inter-terminal interference measurement for terminal pairing to carry out in-band full duplex communication and a communication apparatus and a communication method for giving an instruction for performance of inter-terminal interference measurement.

It is to be noted that the effects described in the present description are just examples, and effects of the present invention are not limited thereto. In addition, the present invention may provide any additional effects besides the aforementioned effects.

Other objects, features, and advantages of the technology disclosed herein will become apparent from the detailed description based on the embodiment and the attached drawings which are described below.

BRIEF DESCRIPTION OF DRAWINGS

FIG. 9 is a diagram schematically depicting a second example of a configuration of an eNB to which the technology disclosed herein is applicable.

DESCRIPTION OF EMBODIMENT

Hereinafter, an embodiment of the technology disclosed herein will be explained in detail with reference to the drawings.

A. System Configuration

First, an explanation will be given of a configuration of a communication system capable of carrying out IB FD communication.

Figure 1:
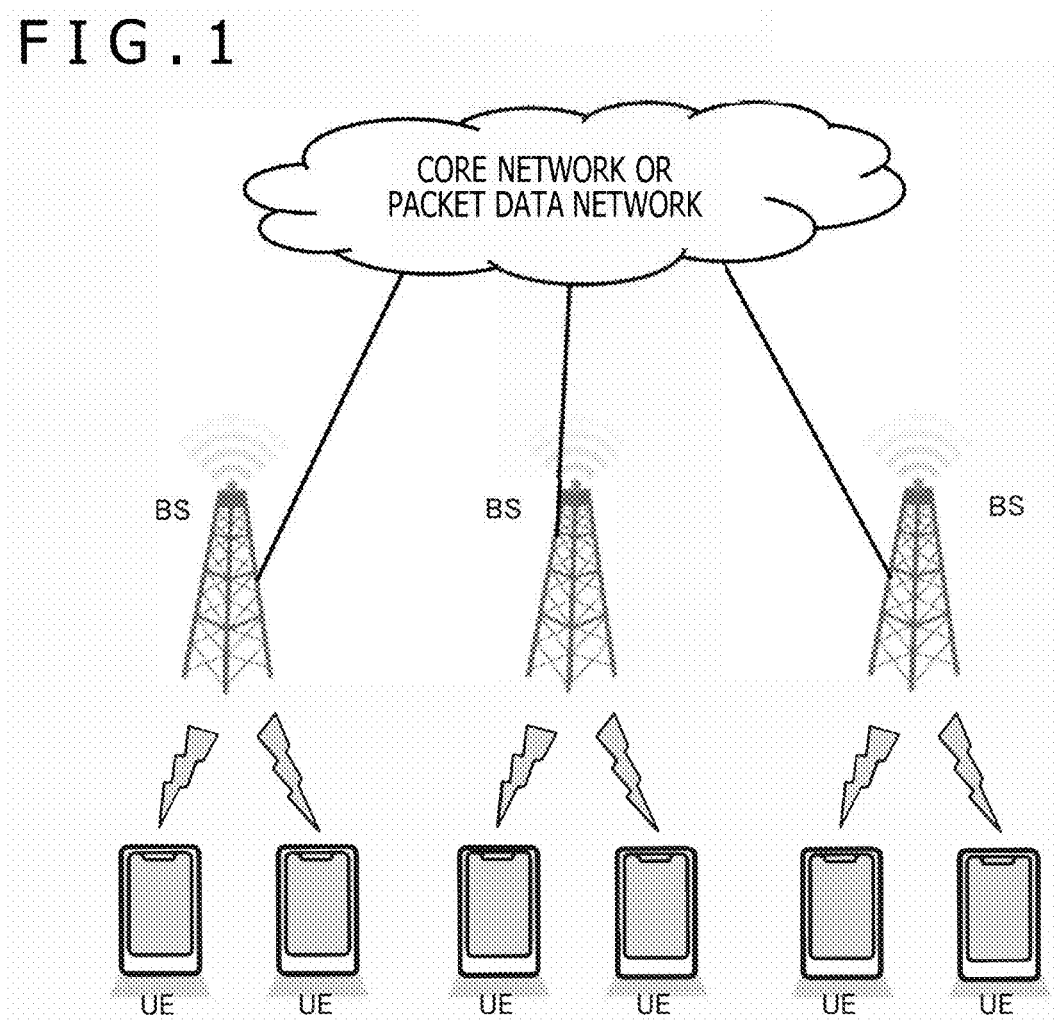
FIG. 1 is a diagram depicting a configuration example of a communication system.

FIG. 1 schematically depicts a configuration example of a communication system to which the technology disclosed herein is applicable. The communication system includes one or more terminals and one or more base stations. The term "terminal" here includes a UE (User Equipment), a User Terminal, a Mobile Terminal, a User Station, a Mobile Station, a Vehicle, a Drone, and an Earth Station. Further, the term "base station" includes a BS (Base Station), an eNB (evolved NodeB: base station in LTE), a gNB (5G-enabled base station), an Access Point, and a satellite space station (Satellite Station, Space Backborne Platform).

In addition, in the present embodiment, it is assumed that, in the communication system depicted in FIG. 1, time resources (e.g., subframes, slots, symbols, etc.) that are identical to or partially overlap one another in a certain frequency channel (e.g., component carrier (CC)) can simultaneously be allocated to a downlink and an uplink, that in-band full-duplex communication (IB FD) can be carried out. An Unpaired Spectrum (Unpaired Frequency Channel) as in TDD is assumed to be used as the frequency channel (CC), that is, a case where separate channels are not prepared for an uplink and a downlink is assumed.

When FD is carried out, transmission and reception are simultaneously performed, a certain base station or a certain terminal, time resources (Radio Frames, Subframes, Slots, Mini Slots, Symbols, etc.) in a certain frequency channel (CC). It is to be noted that a radio frame is defined as a time resource of 10 milliseconds. A subframe is defined as a time resource of one millisecond. A slot is defined as a time resource of 14 OFDM symbols. A mini slot is defined as a time resource of OFDM symbols the number of which is at least two but less than 14.

Figure 2:
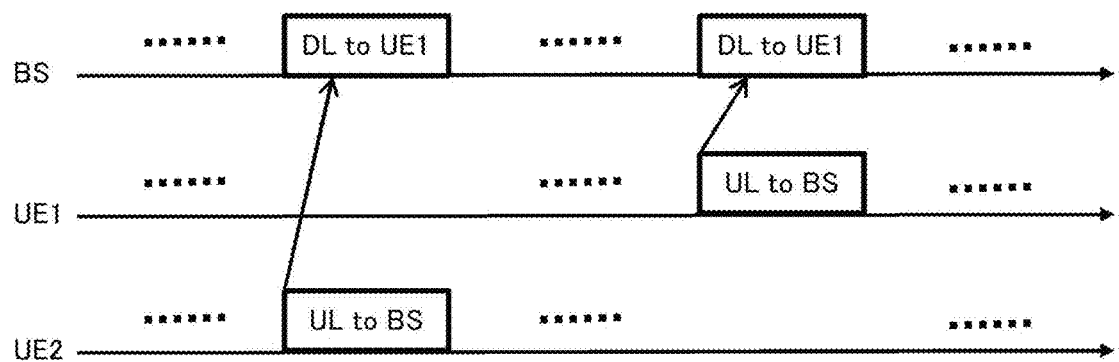
FIG. 2 is a diagram depicting a communication sequence example in which both a base station and terminals (UEs) carry out DE communication.

Further, a case where both a base station and a terminal carry out FD is included within an envisioned range. FIG. 2 depicts a communication sequence example in which both a base station and terminals (UEs) carry out FD communication. In FIG. 2, the horizontal axes represent time axes, quadrangles on the time axes each represent a signal (packet, frame, slot, or subframe) that is transmitted at the indicated time from a communication apparatus correspond in to the time axis, and arrows extending from the quadrangles each represent a transmission direction of the signal. In addition, it is assumed that two terminals UE 1 and UE 2 are connected to the base station.

In the first half of the communication sequence depicted in FIG. 2, transmission of a downlink (DL) signal from the base station to the UE 1 is conducted simultaneously with transmission of an uplink (UL) signal from the UE 2 to the base station. Here, it is assumed that the downlink signal and the uplink signal use identical or overlapping frequency resources and identical or overlapping time resources. Therefore, the base station carries out FD to perform transmission of the downlink signal to the UE 1 concurrently with reception of the uplink signal from the UE 2.

Also, in the latter half of the communication sequence depicted in FIG. 2, transmission of a downlink (DL) signal from the base station to the UE 1 is conducted simultaneously with transmission of an uplink (UL) signal from the UE 1 to the base station. Here, it is assumed that the downlink signal and the uplink signal use the identical or overlapping frequency resources and the identical or overlapping time resources. Therefore, the base station carries out FD to perform transmission of the downlink signal to the UE 1 concurrently with reception of the uplink signal from the UE 1. Moreover, the UE 1 also carries out FD to perform reception of the downlink signal from the base station concurrently with transmission or the uplink signal to the base station.

It is preferable that communication apparatuses (base stations, terminals) that carry out FD are each equipped with a self-interference canceller for cancellation or mitigation of Self-Interference which occurs when FD is carried out. It is to be noted that, in the case where only a base station carries out FD, as depicted in the first half of the communication sequence depicted in FIG. 2, terminals do not necessarily need to be equipped with respective self-interference cancellers.

Further, when FD is not carried out, transmission or reception is performed, each of base stations and terminals with non-overlapping frequency/time resources (for example, by FDD (Frequency Division Duplex) or TDD (Time Division Duplex) in a conventional manner).

Figure 3:
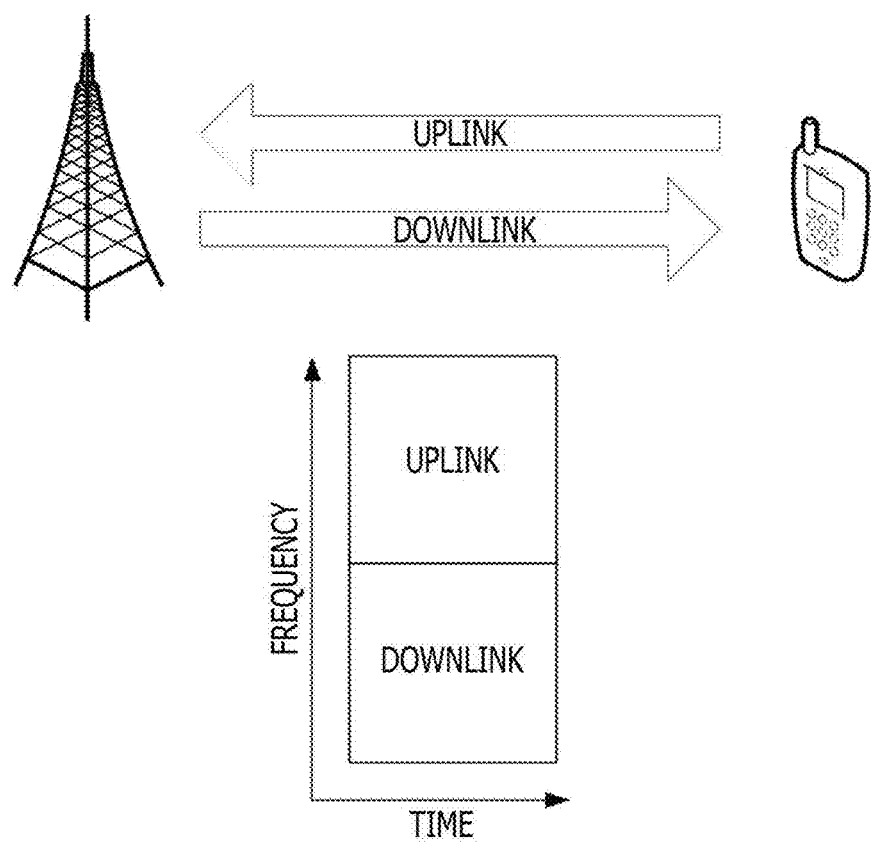
FIG. 3 is a diagram schematically depicting FD FDD.

In the case where FD (i.e., FD FDD) is carried out by frequency division while an uplink and a downlink use radio resources that overlap each other in the time axis direction but do not overlap each other in the frequency axis direction, as depicted in FIG. 3, crosstalk between an uplink signal and a downlink signal can be avoided.

Figure 4:
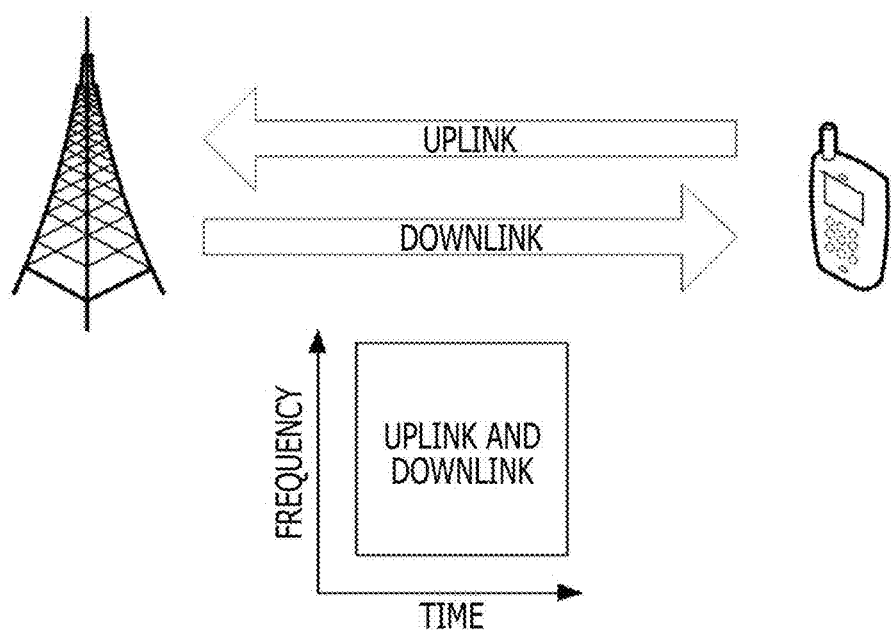
FIG. 4 is a diagram schematically depicting IB FD.

In contrast, in the case where FD is carried out while an uplink and a downlink use radio resources that overlap each other both in the time axis direction and in the frequency axis direction, as depicted in FIG. 4, that is, where IB FD (in-band full-duplex communication) is carried out, the frequency use efficiency can be enhanced to be up to twice that of the FD FDD scheme, which is depicted in FIG. 3.

Figure 5:
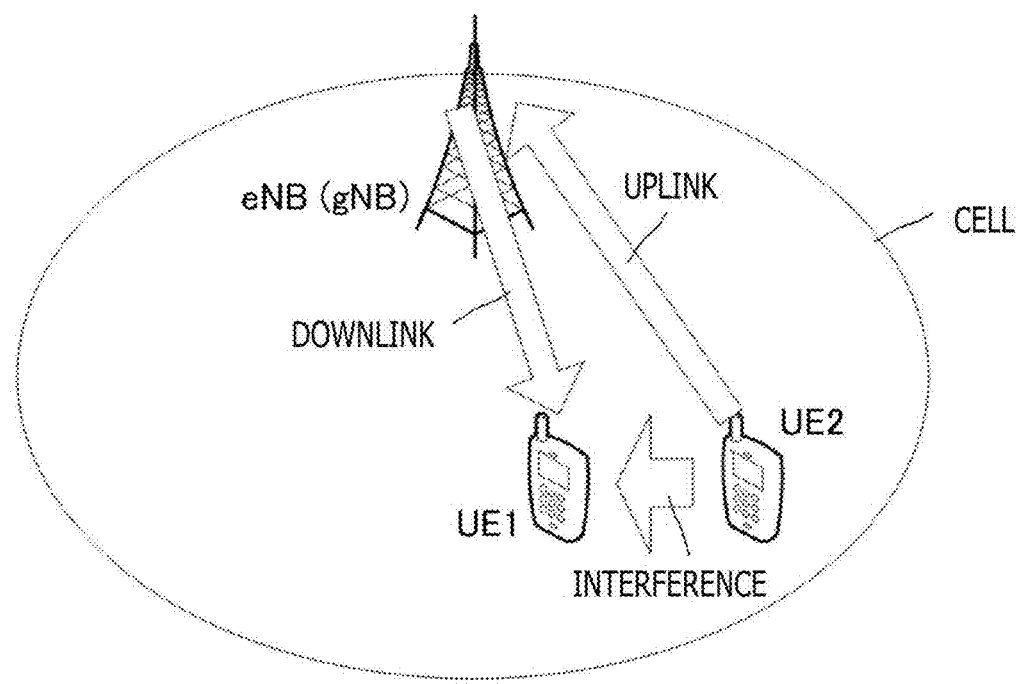
FIG. 5 is a diagram depicting a situation in which IB FD is carried out in the same cell.

One of the technical problems in FD is inter-terminal interference. FIG. 5 depicts a situation in which IB ED is carried out in the same cell. For example, reception, at the terminal UE 1, of a downlink signal from a base station (eNB or gNB) can be conducted simultaneously with transmission of an uplink signal from the other terminal UE 2 to the base station. In this case, there is a possibility for inter-terminal interference in which the uplink signal transmitted from the UE 2 interferes with reception of the downlink signal at the UE 1 to occur.

Figure 6:
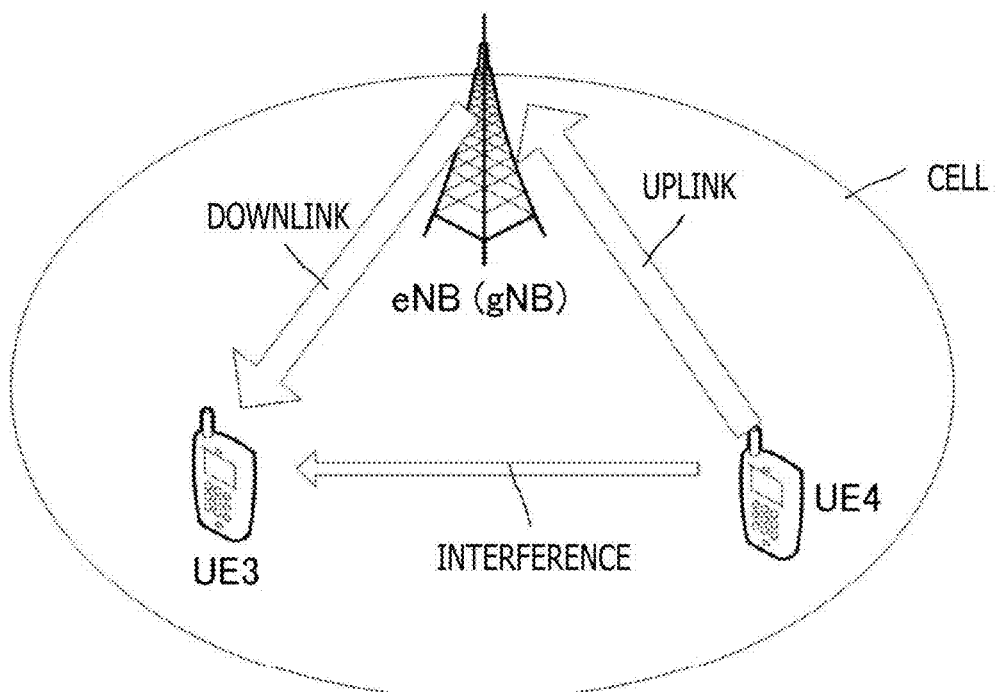
FIG. 6 is a diagram depicting another example in which IB FD is carried out in the same cell.

FIG. 6 depicts another example in which IB FD is carried out in the same cell. Reception, at a terminal UE 3, of a downlink signal from a base station can be conducted simultaneously with transmission of an uplink signal from another terminal UE 4 to the base station. The uplink signal transmitted from the UE 4 is an interference signal for reception of the downlink signal at the UE 3. However, the UE 3 and the UE 4 are sufficiently spaced from each other, and power of the interference signal from the UE 4 is weakened due to propagation loss before the signal arrives at the UE 3. Therefore, the influence of the uplink signal from the UE 4 is small, and thus, the UE 3 can receive and decode the downlink signal from the base station in a suitable manner.

From FIGS. 5 and 6, it can be understood that, in order to reduce inter-terminal interference, search for an appropriate combination (hereinafter, also referred to as "terminal pairing") of a terminal to receive a downlink signal and a terminal to transmit an uplink signal needs to be made.

In order to solve the problem of inter-terminal interference in IB FD, a communication sequence including measuring in advance interference between terminals, selecting an appropriate terminal pair on the basis of the quantity of interference between the terminals, and carrying out IB FD communication is proposed herein.

A terminal (hereinafter, also referred to as "UL UE") that is slated to transmit an uplink signal transmits a reference signal for measuring inter-terminal interference, by using a predetermined timing and a predetermined radio resource. Next, a terminal (hereinafter, also referred to as "DL UE") that is slated to receive a downlink signal measures inter-terminal interference with respect to the UL UE on the basis of the reference signal transmitted from the DL UE and reports the inter-terminal interference to a base station to which the terminal is connected.

For each combination of all or some of the terminals (including every link direction) in the same cell, a series of processes including measuring inter-terminal interference and making a report to a base station is executed. Accordingly, the base station can identify the quantity of inter-terminal interference to be generated when IB FD operation is carried out in the cell. Further, the base station can select an appropriate pair of terminals by scheduling so that IB FD communication can be carried out.

Figure 7:
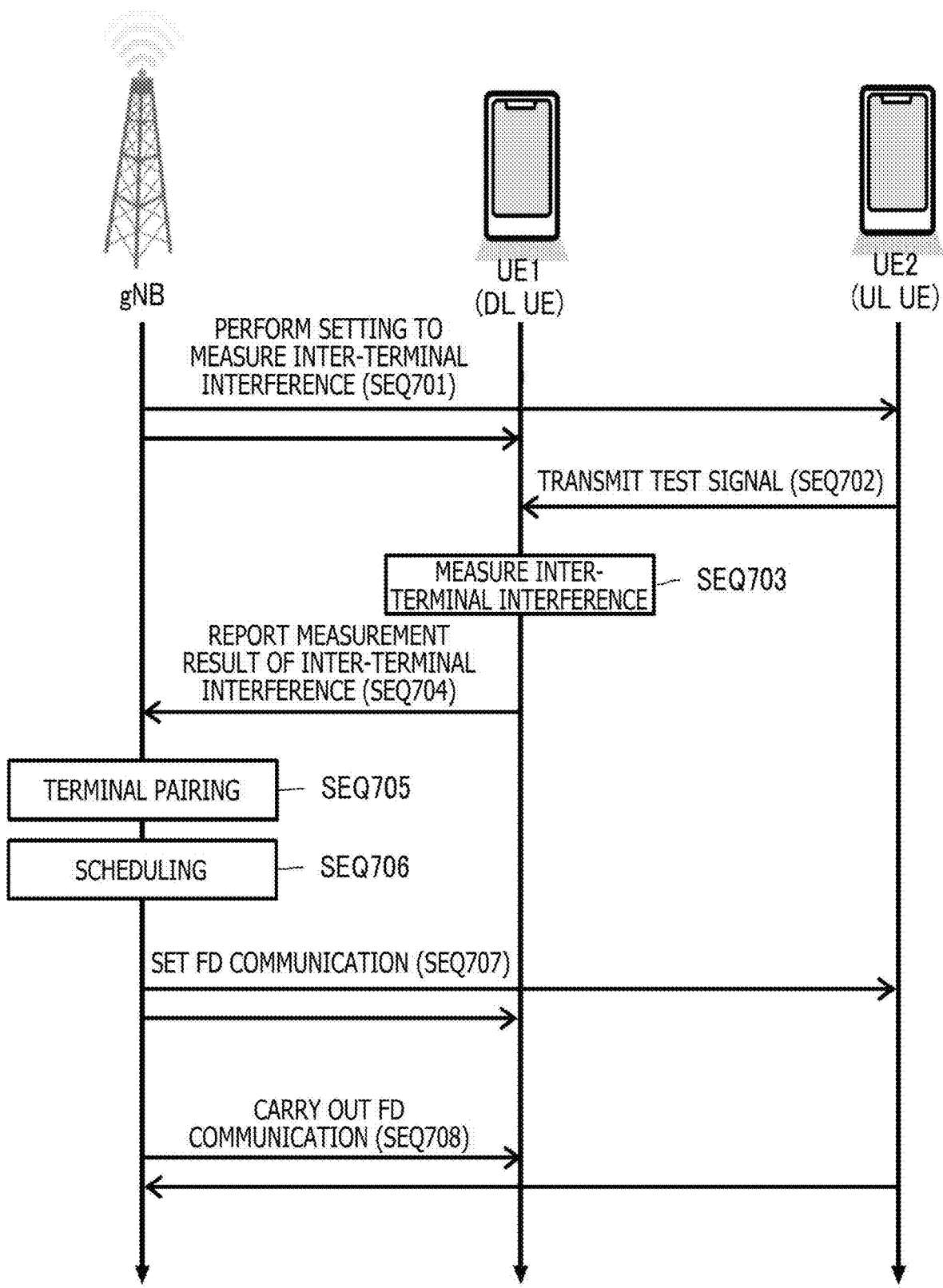
FIG. 7 is a diagram depicting a sequence example of IB FD communication.

FIG. 7 depicts a sequence example of IB FD communication. The depicted communication sequence includes a process of measuring inter-terminal interference and performing terminal pairing on the basis of the measurement result so that IB FD communication is carried out by an appropriately selected pair of terminals.

First, the base station reports setting for measurement of inter-terminal interference to the UE 1 (DL UE) which is a terminal connected to the base station and is slated to be set as a transmission destination of a downlink signal and to the UE 2 (UL UE) which is a terminal connected to the base station and is slated to be as a transmission source of an uplink signal (SEQ 701).

Specifically, the base station reports, to the UL UE, a timing and a radio resource for transmission of a test signal for measuring inter terminal interference. In addition, the base station reports, to the DL UE, measurement of inter-terminal interference on the basis of the test signal that is transmitted by use of the above timing and the above radio resource.

The base station may dynamically report the above designation to the DL UE and the UL UE, by DCI (Downlink Control information) included in a physical downlink control channel (PDCCH) or may semi-statically report the above designation by a MAC CE (Media Access Control Control Element) transmitted by a Physical Downlink Shared Channel (PDSCH) or RRC (Radio Resource Control) signaling. It is to be noted that a control signal that is reported by a PDCCH, a control signal that is reported by a MAC CE, and a control signal that is reported by an RRC signaling are also called an L1 (Layer 1) signaling, an L2 (Layer 2) signaling, and an L3 (Layer 3) signaling, respectively.

The UEs each conduct inter-terminal interference measurement in accordance with instructions from the base station. That is, a test signal is transmitted from the UL UE to the DL UE (SEQ 702), and then, the DL UE measures inter-terminal interference with respect to the UL UE on the basis of the received test signal (SEQ 703) and reports the measurement result to the base station (SEQ 704).

It is to be noted that a series of processes including measuring inter-terminal interference and making a report to the base station is executed for each combination (including the link directions) of all or some of the terminals in the same cell while illustration of this is omitted in FIG. 7. However, when the respective measurement results of the combinations of all the terminals are reported, the control overhead becomes large. Thus, the number of reports on the measurement results to the base station may be restricted to reduce the control overhead.

While also taking the reports on the inter-terminal interference measurement results from the DL UE into consideration, the base station checks whether or not IB FD communication in which transmission of a downlink signal to a DL UE and reception of an uplink signal from an UL UE are combined is being carried out and decides a terminal pair of the DL UE and the UL UE (SEQ 705). Further, the base station conducts scheduling for carrying out IB FD communication (SEQ 706).

When the level of the reported inter-terminal interference is low, the base station determines that the DL UE will suffer from no influence of interference from an uplink signal transmitted from the UL UE (or the influence will be small) upon receiving a downlink signal and then, determines the DL UE and the UL UE as a terminal pair. In addition, the base station conducts scheduling including frequency resources and time resources to be used for the IB FD communication, a modulation scheme, an error correction encoding rate, and a MIMO (Multiple Input Multiple Output) parameter. On the other hand, in the case where the base station determines that the DL UE will suffer from the influence of interference from an uplink signal transmitted from the UL UE (or the influence will be large) upon receiving a downlink signal, the DL UE and the UL UE are not set as a terminal pair.

Then, for the DL UE and the DL UE, the base station performs setting regarding IB FD communication including the scheduling information (SEQ 707). For example, this setting involves setting regarding a radio resource with which the IB FD communication is to be carried out, setting regarding an instruction for carrying out IB FD communication, and the like. This setting is performed dynamically by using a PDCCH or is performed semi-statically by a MAC CE or an RRC signaling, for example.

Subsequently, the base station transmits a downlink signal to the DL UE according to the schedule information set by the base station itself, and at the same time, the UL UE transmits an uplink signal according to the schedule information set by the base station. (SEQ 708). Thus, the base station carries out IB FD communication.

When IB FD communication is appropriately carried out according to a communication sequence such as that depicted in FIG. 7, a measurement method for measuring inter-terminal interference, a feedback method of a measurement result from a terminal to a base station, and the like, are important.

B. Expected System Operation

Next, an explanation will be given of a system operation which is expected in a communication system capable of carrying out IB FD communication.

B-1. Information Indicating Inter-terminal Interference

In LTE (Long Term Evolution: 4G) and NR New Radio: 5G), an indicator indicating a channel state including long-term interference and an indicator indicating a channel state including short-term interference have been introduced. In the present embodiment, it is assumed that interference information which has already been introduced in LTE and NR is used as inter-terminal interference information for deciding a terminal pair.

Examples of an indicator indicating a channel state including long-term interference include Reference Signal Received Power (RSRP: received power), a Received Signal Strength Indicator (RSSI: total received power), and a Signal-to-Interference plus Noise Ratio (SINR: reception signal-to-interference noise ratio). In particular, a long-term indicator is called L2 (Layer 2) and L3 (Layer 3) information. It is to be noted that measurement of L3 is also called RRM (Radio Resource Management) measurement.

RSRP represents reception power that is measured on the basis of a particular reference signal (RS) and corresponds to one-to-one (e.g., a combination of a DL UE and a UL UE) inter-terminal interference information. From RSRP, precise inter-terminal interference can be identified. Examples of the particular reference signal include a CSI (Channel State Information)-RS, a Synchronization Signal (SS), a DeModulation RS (demodulation reference signal: DMRS), and a Sounding RS (sounding reference signal: SRS). However, in the case where respective RSRPs for the combinations of all the terminals, including the link directions, are acquired, there is a problem that the number of targets to be measured is increased.

On the other hand, RSSI and SINR each correspond to one-to-many inter-terminal interference information. That is, RSSI and SINR each correspond to information regarding interference suffered by one interfered terminal suffers due to a plurality of interfering terminals. When RSSI and SINR are used for the inter-terminal interference information, the information can be acquired by a small number (e.g., one) of times of measurement. However, in this case, measurement of precise interference between terminals difficult. It is to be noted that RSSI measured on the basis of a particular reference signal and RSSI measured on the basis of a particular synchronization signal are called RS-RSSI and SS-RSSI, respectively. For example, in RS-RSSI, reception power is measured by using a resource of a particular reference signal. Similarly, in SS-RSSI, reception power is measured by using a resource of a particular synchronization signal. Further, SINR measured on the basis of a particular reference signal and SINR measured on the basis of a particular synchronization signal are called RS-SINR and SS-SINR, respectively. For example, in RS-SINR, reception power and/or interference power is measured by using a resource of a particular reference signal. Similarly, in SS- SINR, reception power and/or interference power is measured by using a resource of a particular synchronization signal.

In addition, examples of the indicator indicating a channel state including short-term interference include CSI. CSI is formed so as to include a Channel Quality Indicator (CQI), a Precoder Matrix indicator (PMI), a Rank indicator (RI), a CSI-RS Resource Indicator (CRI), a Strongest Layer Indicator (SLI), an L1-RSRP, etc. CQI is an indicator obtained by quantizing communication path quality information such as SINR and corresponds to one-to-many inter-terminal interference information. A short-term indicator is particularly called L1 (Layer 1) information.

Basically, a measurement time period set for L3-RSRP, RSSI, and SINR is long while a measurement time period set for L1-RSRP and CQI is short. It is to be noted that L3-RSRP, RSSI, and SINR are L3 measurement information. L1-RSRP and CQI are L1 measurement information.

It is to be noted that one-to-many inter-terminal interference information includes one-to-one inter-terminal interference information.

B-2. Signal that can be used in Inter-Terminal Interference Measurement

Examples of a test signal for measuring inter terminal interference include a reference signal (RS) including a known pattern, etc., and a data channel.

In the case where a reference signal, which is the former in the examples, used, a base station such as a gNB can identify inter-terminal interference on the basis of a radio resource which is a measurement target and a stream of a reference signal received in the radio resource. Prior to measurement, a terminal receives a report on information regarding the radio resource which is a measurement target and/or the stream of the reference signal from the base station. The reference signal here can be reworded to a signal a stream, etc., of which is set by a base station.

Further, the data channel, which is the latter in the examples, is mainly a Physical Uplink Shared Channel (PUSCH) or a Physical Sidelink Shared Channel (PSSCH). A base station such as a gNB can identify inter terminal interference on the basis of reception power in a radio resource which is a PUSCH and/or PSSCH measurement target, or the like. It is to be noted that the data channel here may include a channel and a signal that are difficult for a terminal to identify, that is, a control channel (Physical Uplink Control Channel (PUCCH), Physical Sidelink Control Channel (PSCCH)) or a reference signal which is not set by a base station, for example. In addition, the data channel here can be reworded to a signal a stream, etc., of which is not set by a base station.

B-3. Correspondence between Interference Information and Measurement Signal

Interference information indicating inter-terminal interference and a signal that can be used to measure inter-terminal interference have been explained separately above. Now, an explanation will be given of the correspondence between interference information and a signal to be used for measurement of the interference.

In the case where RSRP is used as long-term one-to-one inter-terminal interference information, a reference signal (RS) is expected to be used as the test signal. In the first place, RSRP is defined as reception power of a reference signal. As one example of the reference signal, SRS which is an uplink reference signal is expected to be used. SRS is a reference signal that is normally used by a base station to estimate the state of an uplink channel of each terminal required for scheduling (and timing control). RSRP which is measured on the basis of SRS is also called SRS-RSRP. As another example of the reference signal, DMRS which is used to demodulate PUSCH or PSSCH is expected to be used.

In addition, in the case where RSSI or SINR is used as long-term one-to-many inter-terminal interference, a data channel (PUSCH) is desirably used as a test signal because the data channel is interference information that can be measured simply by reception of power.

Similarly, also in the case where CQI is used as short-term one-to-many inter-terminal interference, a data channel (PUSCH) desirably used as the test signal. CQI is an indicator obtained by quantizing communication path quality information such as SINR. The same reason as that described above applies.

B-4. Format of Feedback Information

Each terminal feeds back (reports) measured inter-terminal interference information such as RSRP, RSSI, SINR, and CQI to a base station to which the terminal is connected. From the viewpoint of performing terminal pairing an the basis of the received inter-terminal interference information, the base station side needs to manage the inter-terminal interference information for each measurement target terminal (terminal that has transmitted a test signal). In addition, from the viewpoint of performing scheduling, that is, allocating radio resources to each terminal, on the basis of the received inter-terminal interference information, the base station side needs to manage the inter-terminal interference information for each radio resource (to manage the inter-terminal interference information to specify the radio resource in which the interference information was measured).

In the communication sequence example depicted in FIG. 7, the UE 1 associates the inter-terminal interference information measured on the basis of the test signal from the UE 2 with identification information. (UE ID) regarding the UE 2 which is the transmission source of the test signal or with an ID (UE combination ID) representing the combination of the UE 1 and the UE 2 and feeds back (reports) the information to the base station. Examples of the UE ID include an RNTI (Radio Network Temporary Identifier). An RNTI used as the UE ID may be a C-RNTI (Cell-RNTI) or may be a new RNTI (i.e., RNTI for IB FD communication). Further, the UE combination ID may be expressed by a combination of UE IDs of respective UEs or may be expressed by new identification information. The base station has identified the radio resource by which an instruction for measurement of inter-terminal interference has been given to the UE 1 which is the transmission source of the feedback signal. Therefore, the base station can manage the inter-terminal interference information received from the UE 1 in association with the combination of the respective UE IDs of the UE 1 and the UE 2 (in other words, a DL UE and a UL UE) and the radio resource.

B-5. Method for Giving Instruction on Interference Setting

A base station designates, for a terminal, a radio resource to be set as an inter-terminal interference measurement target. Also, in the case where inter-terminal interference is measured by using a reference signal, the base station needs to report, to the terminal, information regarding a stream of the reference signal. Then, the base station may dynamically report on instruction regarding measurement of inter-terminal interference on each terminal, through a physical downlink control channel (PDCCH) or may semi-statically report on the instruction through a MAC CE or an RRC signaling transmitted by a physical downlink shared channel (PDSCH).

In the case where an instruction for measurement of inter-terminal interference is given by use of PDCCH, the resource index of a radio resource which is a measurement target, the index of a reference signal (RS) stream to be used for measurement, and an UE ID (in the case where the instruction is in common with an instruction for transmission) are set as a PDCCH parameter. In the case where PDCCH is used, it is assumed that resource sets are indexed in advance and that the resource sets are associated with respective resource indexes.

In the case where an instruction for measurement of inter-terminal interference is given by an RRC signaling, information for designating a time resource and a frequency resource which are measurement targets and information regarding a reference signal (RS) stream to be transmitted in the case where a reference signal is to be used for measurement are set as MAC CE or RRC parameters.

B-6. Resource with which FD can be Carried out

Not every radio resource can be used for FD, and restrictions are imposed to a certain extent.

B-6-1. Case where Instruction for Carrying out FD is Given by use of SFI

Slots are classified into DL (Downlink), UL (Uplink), and X (flexible). A terminal can recognize a link direction from an SFI (Slot Format Indicator) transmitted by PDCCH. The format of an SFI is defined on a slot basis (combination of 14 OFDM symbols). The format of an SFI designates any one of DL, UL, or X for each OFDM symbol.

In the case where an instruction for carrying out FD is given by SFI, a slot further includes FD. Moreover, FD can be designated by an SFI on an OFDM symbol basis. With a resource that is designated as an FD region by the base station with use of SFI, FD communication can be carried out. Specifically, with a resource that is designated as an FD region by an SFI, a data channel PDSCH for a downlink and a data channel PUSCH for an uplink are designated by UE-specific DCI (Downlink Control Information), and a terminal receives a downlink signal or transmits an uplink signal by using the designated data channels so that at least either one of the base station or the terminal can carry out FD communication.

However, even with a resource that is designated as an FD region by SFI, it is desirable that FD communication is not carried out through a control channel such as PDCCH or PUCCH. Alternatively FD communication may be carried out through a control channel, but this leads to transmission using PDCCH or PUCCH which degrades the encoding rate. By PDCCH, control information concerning scheduling or resource allocation, for example, is transmitted. By PUCCH, a signal of a response (ACK, NACK, DTX (Discontinuous Transmission), HARQ (Hybrid Automatic Repeat Request)) to data is transmitted. This is for eliminating a possibility that, when FD communication is carried out, degradation the reception quality due to self-interference inhibits decoding of important control information.

In brief, FD communication can be carried out in an FD region that is dynamically designated by use of an SFI, but it is desirable that PDCCH or PUCCH is not transmitted with a resource that is designated as an FD region.

B-6-2. Case of Resource which is Designated as DL by Semi-Static DL/UL Configuration but is Designated as UL by UE-Specific DCI while FD is not Dynamically Designated by SFI Besides an SFI, some kinds of information designate an uplink and a downlink. For example, semi-static DL/UL configuration is information for semi-statically designating an uplink and a downlink and is transmitted to a terminal in advance by an RRC signaling. In the case of a resource that is designated in advance as a downlink by this semi-static DL/UL configuration and is then dynamically designated as an uplink by PDCCH (UE-specific DCI), a resource with which FD can be carried out is determined according to a channel to be used.

(1) With a Resource including an SS Block that includes an SS and a Physical Broadcast Channel (PBCH), FD Communication is not Carried out This is for eliminating a possibility that the reception quality is degraded due to self-interference such that synchronization cannot be achieved.

(1-1) Operative Example 1

With a subframe in which an SS block is transmitted, FD communication cannot be carried out, while, with a subframe other than a subframe in which an SS block is transmitted, FD communication can be carried out. However, even if an SS block is not actually transmitted through a subframe including a resource of an SS block, FD communication cannot be carried out. Alternatively, with a subframe in which an SS block is actually transmitted, FD communication cannot be carried out, while, with a subframe in which an SS block is not transmitted, FD communication can be carried out.

(1-2) Operative Example 2

With an OFDM symbol through which an SS block is transmitted, FD communication cannot be carried out, while, with an OFDM symbol other than the OFDM symbol through which an SS block is transmitted, puncturing (removing data partially overlapping an SS block) or rate matching (encoding rate control and arranging data sets so as not to overlap an SS block) is performed so that FD communication can be carried out. However, with an OFDM symbol including a resource for an SS block, FD communication cannot be carried out even when an SS block is not actually transmitted through the OFDM symbol. Alternatively, with an OFDM symbol through which an SS block is actually transmitted, FD communication cannot be carried out, while, with a subframe through which a SS block is not transmitted, FD communication can be carried out.

(1-3) Operative Example 3

With an RE (Resource Element) through which an SS block is transmitted, FD communication cannot be carried out, while, with an RE other than an RE through which an SS block is transmitted, FD communication can be carried out. Only in the case where PUSCH is transmitted by OFDM, FD communication can be carried out with an RE other than an RE through which an SS block in the subframe is transmitted. Also, in the case where PUSCH is transmitted by SC-FDMA (Single-Carrier Frequency-Division Multiple Access), puncturing or rate matching (encoding rate control) cannot be performed on an RE basis so that FD communication cannot be carried out. It is to be noted that, in 5G, OFDM waveforms are supported in a downlink (PDCCH), and both OFDM and SC-TDMA waveforms are supported in an uplink (PUSCH). Meanwhile, in 4G, OFDM is supported in a downlink (PDSCH), and SC-FDMA is supported in an uplink (PUSCH).

(2) In a PDCCH Region (Resource including PDCCH), FD Communication is not Carried Out This is for eliminating a possibility that degradation of the reception quality due to self-interference inhibits decoding of important control information. In one operative example, FD communication is inhibited from being carried out with all the resources in which PDCCH and PUCCH can be transmitted. In addition, in another operative example, among resources set for PDCCH or PUCCH, with a resource in which any transmission has not actually been performed, uplink and downlink transmission can be performed, and thus, FD communication can be carried out.

(3) Basically, FD Communication can be Carried out in a PDSCH Region

However, FD communication may be inhibited according to the content of data transmitted in the PDSCH region. For example, for data to be transmitted to a terminal (e.g., a terminal for automatic driving or remote medical use) that secures low delay and high reliability, FD communication may be inhibited. This is for avoiding occurrence of delay due to multiplexing and decreased reliability. For example, URLLC (Ultra-Reliable and Low Latency Communication) data is transmitted without being multiplexed in FD communication.

In brief, regarding a resource that is not dynamically designated as an FD region but is designated as a downlink in advance or semi-statically and is then dynamically designated as an uplink, a resource with which FD communication can be carried out is determined according to a channel to be used.

B-6-3. Case of Resource which is Designated as UL by Semi-Static DL/UL Configuration but is Designated as DL by UE-Specific DCI while FD is not Designated by SFI Also in a case where a resource is designated in advance as an uplink by semi-static DL/UL configuration and is then dynamically designated as a downlink by PDCCH (UE-specific DCI), a resource with which FD communication can be carried out is determined according to a channel to be used.

(1) FD Communication is not Carried out in a PUCCH Region

This is for eliminating a possibility that degradation of the reception quality due to self-interference inhibits decoding of important control information.

(1-1) Operative Example 1

With all the resources in which PUCCH can be transmitted, FD communication is inhibited. In the case where a resource of PUCCH semi-statically designated by an RRC signaling overlaps a resource of PDSCH dynamically designated by an UE-specific DCI, the PDSCH is punctured (data partially overlapping the PUCCH is deleted) or is subjected to rate matching (encoding rate control and arranging data so as not to overlap the PUCCH).

(1-2) Operative Example 2

Even with a resource for which PUCCH is set, FD communication can be carried out when transmission is not actually carried out. Whether or not transmission is to be actually carried out is dynamically determined. Thus, the PUCCH basically includes HACK-ACK. When a resource through which transmission by PUCCH is performed is dynamically designated by a DCI and the resource overlaps a resource for a PDSCH, the PDSCH is punctured (data partially overlapping the PUCCH is deleted) or is subjected to rate matching (encoding rate control and arranging data so as not to overlap the PUCCH). Overlapping resources can be designated by use of a Pre-emption indicator. From the pre-emption indicator, a terminal recognizes which resources overlap.

(3) Basically, FD Communication can be Carried out in a PDSCH Region

However, FD communication may be inhibited according to the content of data transmitted in the PDSCH region. For example, for URLLC data, FD communication may be inhibited. This is for avoiding occurrence of delay due to multiplexing and decrease in reliability (as described above).

In brief, regarding a resource for which an FD region is not dynamically designated but which is designated as an uplink in advance or semi-statically and is then dynamically designated as a downlink, a resource with which FD communication can be carried out is determined according to a channel to be used.

B-7. Resource with which FD Cannot be Carried Out

Resources that should not be used for FD communication in the first place are as follows. It is assumed that a terminal does not carry out FD communication under the following conditions.

(1) FDD Band, SDL (Supplemental DL) Band, and SUL (Supplemental DL) Band

It is desirable that FD be inhibited in a downlink band and an uplink band of FDD. This is because, in a downlink band and an uplink band of FDD, coexistence of a downlink signal and uplink signal prohibited under law.

(2) Band in which Transmission of Uplink Signal should be Avoided in View of Band Combination In a downlink band in which IM (Inter-Modulation) occurs against another band due to the influence of occurrence of a high-frequency wave, an uplink signal should not be transmitted in order to avoid interference. Therefore, it is desirable that FD communication is inhibited.

(3) Timing at which Measurement Gap is Set

In the first place, data transmission is inhibited in a section (Measurement gap) that is provided for measuring the reception quality of another band. Thus, naturally, it is desirable that FD communication is inhibited. It is noted that Measurement gap is specified in the 3G or subsequent cellular communication schemes.

(4) Resource that is Always Designated as Downlink (Always DL, Static DL) in TDD In TDD, switching between an uplink and a downlink can be performed dynamically. However, it is desirable that FD communication is not carried out with a resource that is designated as a downlink in advance. For example, a resource for Periodic CSI-RS for RRM measurement is allocated to a downlink in order to periodically transmit a reference signal for measurement in management of radio resources, and thus, it is desirable that, with such a resource, FD communication is not carried out. Also, a resource for Periodic CSI-RS for beam management is allocated to a downlink in order to periodically transmit a reference signal for beam management, and thus, it is desirable that, which such a resource, FD communication is not carried out.

(5) Resource that is Always Designated as Uplink (Always UL, Static UL) in TDD

In TDD, switching between an uplink and a downlink can be performed dynamically. However, it is desirable that FD communication is not carried out with a resource that is designated as an uplink in advance. For example, it is desirable that FD communication is not carried out with a resource set for uplink measurement (UL measurement) use, such as a resource allocated in order to transmit a Periodic SRS.

B-8. Method for Designating Resource for Transmission of Test Signal

A base station may dynamically report, to a terminal subordinate to the base station, a resource for transmission of a test signal. For example, the base station may report on a resource for transmission of a test signal for each radio resource by using a PDCCH.

Further, the base station may semi-statically report, to the terminal, a resource for transmission of a test signal. For example, the base station may periodically set, for the terminal, a resource for transmission of a test signal by using an RRC signaling.

C. Method for Designating Resource to be Set as Interference Measurement Target

Now, an explanation will be given of a method by which a base station makes, for terminals subordinate to the base station, designation of a resource to be set as an interference measurement target. With a resource to be set as an interference measurement target, FD communication is carried out. The base station gives an instruction for measurement of interference to a terminal trying to perform paring in this resource. Hereinafter, explanations will be given of a case of carrying out FD communication by further adding an uplink to a resource semi-statically allocated to a downlink and a case of carrying out FD communication by further adding a downlink to a resource semi-statically allocated to an uplink.

C-1. Case where Uplink is Added to Downlink Resource

First, an explanation will be given of a method for designating a target resource in the case where an uplink is dynamically added to a resource semi-statically allocated to a downlink. A base station dynamically designates a resource to be set as an interference measurement target in some cases and semi-statically designates such a resource in the other cases. A terminal measures interference in a resource designated by the base station to which the terminal is connected and feeds back the interference to the base station.

C-1-1. Case where Interference is Measured in Dynamically Designated Resource

Upon receiving, through a PDCCH, an interference measurement instruction from a base station to which a terminal is connected, the terminal conducts interference measurement in a designated resource and sequentially feeds back the measurement result to the base station.

Methods for giving a measurement instruction from a base station to a terminal can be classified into a method for giving the common interference measurement instruction to plural terminals (e.g., every terminal subordinated to the base station) and a method for giving respective interference measurement instructions to the terminals.

(1) Case where Common Interference Measurement Instructions are Given to Plural Terminals By using PDCCH commonly transmitted to plural terminals, a base station gives interference measurement instructions and designates a resource to be set as a measurement target. For example, a resource to be set as a measurement target can be designated by an SFI. PDCCH that is commonly transmitted to the plural terminals is scrambled with an ID (RNTI) common to the plural terminals. The ID common to the plural terminals is desirably an RNTI (FD-RNTI) defined for FD communication use.

In the case where the common interference measurement instructions are given to plural terminals, an effect that signal overhead in a PDCCH can be reduced is provided.

Further, in the case where the common interference measurement instructions are given to plural terminals, the same signal can be used for a resource which is a measurement target and for giving an instruction for transmission of a test signal.

For example, since PDCCH through which a base station gives an interference measurement instruction includes an UE ID, a terminal corresponding to the UE ID transmits a test signal while the remaining terminals measure interference by using the test signal.

Alternatively, a terminal in which a resource designated through PDCCH is identical to a resource designated as an uplink resource by Semi static DL/UL configuration designated by an RPC signaling transmits a test signal. In contrast, a terminal in which a resource designated through PDCCH is identical to a resource designated as a downlink by a Semi static DL/UL configuration designated by an RRC signaling measures interference by using the test signal.

(2) Case where Specific Interference Measurement Instruction is Given to Terminal A base station gives an interference measurement instruction and designates a resource to be set as a measurement target, by transmitting PDCCH specific to a terminal that is desired to measure inter-terminal interference. In response, the terminal having received the interference measurement instruction measures interference in the designated resource.

In the case where an interference measurement instruction specific to each terminal is given, an effect that a terminal to perform measurement and a terminal that does not need to perform measurement can dynamically be selected is provided.

C-1-2. Case where Interference is Measured in Semi-Statically Designated Resource When receiving, from a base station connected to a terminal, an interference measurement instruction through high-order layer control information by an RRC signaling or the like, the terminal periodically conducts interference measurement in a designated resource. Each time conducting interference measurement, the terminal may feed back the measurement result to the base station. Alternatively, on demand from the base station, the terminal may feed back the (latest) measurement result to the base station.

C-2. Case where Downlink is Added to Uplink Resource

Also in the case where a downlink is dynamically added to a resource semi-statically allocated to an uplink, the similar process is executed as in the case where an uplink is dynamically added to a resource semi-statically allocated to a downlink. A base station dynamically designates a resource to be set as an interference measurement target by using PDCCH in some cases and semi-statically designates such a resource by an RRC signaling in other cases.

D. Resource to be Set as Interference Measurement Target

Now, an explanation will be given of a resource to be set as an interference measurement target. A resource to be set as an interference measurement target is, in other words, a resource with which FD communication can be carried out. In contrast, a resource which is not set as an interference measurement target (or in which measurement cannot be conducted) refers to a resource with which FD communication cannot be carried out.

D-1. Case where Interference Measurement is Conducted in Downlink

As described above, a resource that is designated as a downlink by semi-static DL/UL configuration but is designated as an uplink by a UE-specific DCI while FD is not dynamically designated by SFI is a resource with which FD communication can be carried out. Thus, this resource is set as an interference measurement target.

A terminal conducts interference measurement in a downlink slot further designated by a high-order layer (RRC signaling).

Meanwhile, in the case where data, such as URLLC data, for which high reception quality is required and multiplexing of which is not desirable is transmitted in a downlink (PDSCH region), FD communication is prohibited, and thus, the resource is not set as an interference measurement target.

D-2. Case where Interference Measurement is Conducted in Uplink

As described above, a resource that is designated as an uplink by semi-static DL/UL configuration but is designated as a downlink by a UE-specific DCI while an instruction for carrying out FD communication is not given by use of an SFI is a resource with which FD communication can be carried out, and thus, the resource is set as an interference measurement target.

A terminal conducts interference measurement in an uplink slot further designated by a high-order layer (RRC signaling).

Meanwhile, in the case where data, such as URLLC data, for which high reception quality is required and multiplexing of which is not desirable is transmitted in a downlink (PDSCH region), FD communication is prohibited, and thus, the resource is not set as an interference measurement target.

E. Feedback of Inter-Terminal Interference Information

A terminal feeds back, to the base station, inter-terminal interference information measured in a resource designated by a base station to which the terminal is connected. However, if measurement results of the combinations of all the terminals in a cell are reported, the control overhead becomes large. Therefore, the number of feedbacks of measurement results to the base station may be restricted to decrease the control overhead.

For example, feedback on N sets of inter-terminal interference information indicating the smallest to N-th smallest quantities of measured interference is provided to the base station such that the number of feedbacks is suppressed. Alternatively, feedback on N sets of inter-terminal interference information indicating the highest to N-th highest measured estimation SINR is provided to the base station such that the number of feedbacks is suppressed. The value of N may be set by an RRC signaling or may be set in advance in the terminal.

Also, only in the case where a predetermined condition is satisfied, the terminal may feed back inter-terminal interference information to the base station such that the feedback of the inter-terminal interference information regarding a terminal pair having a small FD effect is limited. One example of the case where the abovementioned predetermined condition is satisfied is a case where an estimation SINR (or a value corresponding to SINR such as CQI) obtained by measurement is equal to or greater than a predetermined threshold.

In addition, inter-terminal interference information that is not transmitted to the base station as a result of the limitation on feedback is controlled by use of non-full duplex information (i.e., normal DL, UL, and SL with which FD communication is not carried out).

F. Power Control in Uplink
F-1. Power Control during Interference Measurement If transmission power of an uplink test signal which serves as a reference during measurement is unclarified, precise measurement of the quantity of interference is difficult. Therefore, transmission power of the test signal is reported to a terminal that measures interference.

Transmission power of the test signal may be designated by a base station. For example, in the case where a resource for interference measurement is dynamically designated, transmission in the case where a resource for interference measurement is semi-statically designated, a transmission power value of the test signal as a reference may be designated by an RRC signaling.

Alternatively, a terminal side may decide transmission power of a test signal and report the transmission power value to the base station. For example, an interfering terminal may report, to the base station, transmission power used to transmit the test signal. In addition, in another method, when acquiring a test signal and information regarding transmission power of the test signal from an interfering terminal, an interfered terminal may calculate a propagation loss of the received test signal and report the interference information (propagation loss) to the base station.

It is to be noted that the term "interfering terminal" here refers to a terminal that is expected to transmit an uplink signal during FD communication and thus, transmits a test signal. For example, such a terminal corresponds to the UE 2 in the communication sequence depicted in FIG. 7. Further, the term "interfered terminal" refers to a terminal that is expected to, when receiving a downlink signal during FD communication, suffer from interference by an uplink signal transmitted from an interfering terminal. For example, such terminal corresponds to the UE 1 in the communication sequence depicted in FIG. 7.

F-2. Power Control during Communication

A terminal to transmit an uplink signal during FD communication dynamically and appropriately controls the transmission power so that inter-terminal interference can be suppressed and the communication quality of FD communication can be improved. For example, transmission power of an uplink signal may be reported by "UL grant" in which a base station allocates an uplink radio resource to terminals. The UL grant is a kind of a DCI format, is used for PUSCH scheduling, and is transmitted by PDCCH. One example of a method for reporting transmission power of an uplink signal is making a report using an absolute value. The terminal receives designation of the absolute value of transmission power through a field (e.g., 2-bit field) which the absolute values of a plurality of transmission power candidates are set in advance by an RRC signaling and which is included in the UL grant. The terminal transmits an uplink signal by using the designated transmission power. In addition, one example of a method for reporting transmission power of an uplink signal is reporting using a relative value (offset value). Transmission power of an uplink signal is calculated by adding a relative value (e.g., −3 dB, −1 dB, +1 dB, or +3 dB) of transmission power designated by a bit field (e.g., 2-bit field) included in the UL grant to a transmission power value decided by a PRB number, MCS, a path loss, or the like. The terminal performs uplink transmission by using the finally calculated transmission power.

G. Power Control in Downlink

A base station appropriately controls transmission power of a downlink signal during FD communication such that self-interference on reception of an uplink signal with transmission of the downlink signal can be suppressed and the communication quality of FD communication can be improved.

The base station dynamically controls power in a PDSCH in association with scheduling. For example, when a downlink signal is transmitted to a terminal located near the base station, FD communication is carried out with the transmission power reduced. Also, when a downlink signal is transmitted to a terminal located far from the base station, FD communication is carried out with transmission power not reduced.

In addition, the base station may perform coordinated power control in a downlink. For example, in order to satisfy an uplink SINR at a cell edge, simultaneous downlink transmission power between adjacent cells is reduced in a predetermined subframe (slot, slot set, or subframe set). Respective base stations of adjacent cells share information regarding subframes in which coordinated power control is performed or regarding transmission power or power offset in a downlink, through a backhaul. (X2 interface, S1 interface, or Xn interface for example.

H. Application Examples

The technology disclosed herein is applicable to various products. For example, a base station may be realized by a certain type of an eNB, such as a macro eNB, or a small eNB. The small eNB may be an eNB, such as a pica-eNB, a micro eNB, or a home (femto) eNB, that covers a smaller cell than a macro cell. In contrast, a base station may be realized by another type of a base station such as a NodeB or a BTS (Base Transceiver Station). The base station may include a main body (also referred to as a "base station apparatus") that controls wireless communication and one or more RRHs (Remote Radio Heads) that are disposed in a site separated from the main body. In addition, various types of terminals, which will be explained later, may be operated as a base station by temporarily or semi-permanently executing a base station function.

Further, for example, a terminal may be realized by a mobile terminal such as a smartphone, a tablet PC, a notebook PC, a portable game terminal, a portable/dongle-type mobile router, or a digital camera or an on-vehicle terminal such as a car navigation apparatus. Alternatively, a terminal may be realized by a terminal for carrying out M2M (Machine To Machine) communication (also referred to as an MTC (Machine Type Communication terminal). Moreover, a terminal may be a wireless communication module (e.g., integrated circuit module formed by one die) that is mounted on any one of the abovementioned terminals.

H-1. Application Examples Regarding Base Station Apparatus

H-1-1. First Application Example

Figure 8:
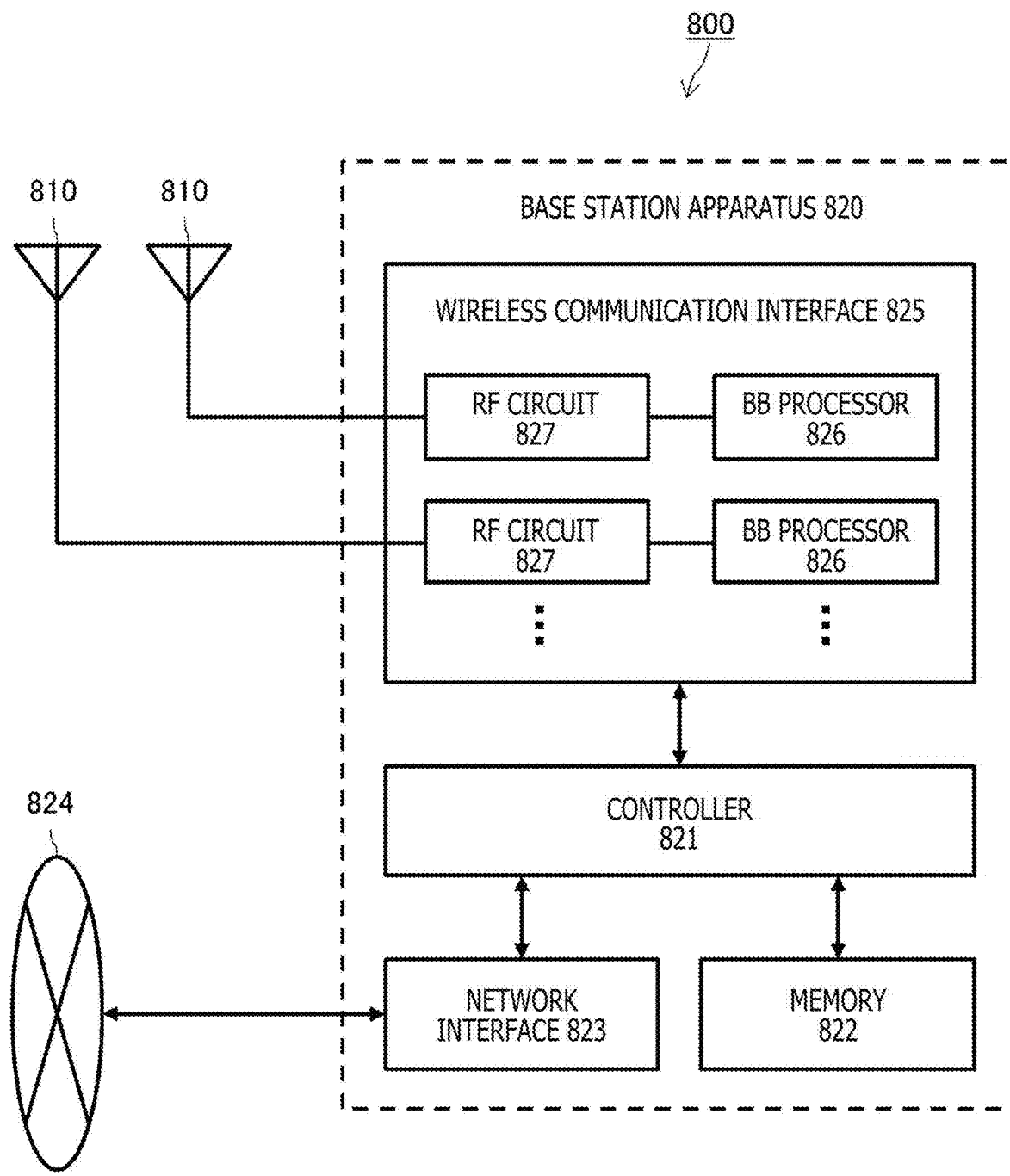
FIG. 8 is a diagram schematically depicting a first example of a configuration of an eNB to which the technology disclosed herein is applicable.

FIG. 8 is a block diagram schematically depicting a first example of a configuration of an eNB to which the technology disclosed herein is applicable. The eNB 800 includes one or more antennas 810 and a base station apparatus 820. Each of the antennas 810 and the base station apparatus 820 are mutually connected via an RF cable.

The antennas 810 each include one or more antenna elements (e.g., a plurality of antenna elements constituting a MIMO antenna) and are used for transmission and reception of a radio signal by the base station apparatus 820. The eNB 800 includes a plurality of the antennas 810, as depicted in FIG. 8, and the plurality of antennas 810 may respectively correspond to a plurality of frequency bands being used by the eNB 800, for example. It is to be noted that while FIG. 8 depicts the example in which the eNB 800 includes the plurality of antennas 810, one antenna 810 may be included in the eNB 800.

The base station apparatus 820 includes a controller 821, a memory 822, a network interface 823, and a wireless communication interface 825.

The controller 821 may be a CPU (Central Processing Unit) or a DSP (Digital Signal Processor), for example, and operates various functions of a higher-order layer of the base station apparatus 820. For example, the controller 821 generates a data packet from data in a signal processed by the wireless communication interface 825 and transfers the data packet via the network interface 823. The controller 821 may generate a bundled packet by bundling data from a plurality of baseband processors 826 and transfer the generated bundled packet. In addition, the controller 821 may have a logical function of performing control such as radio resource control, radio bearer control, mobility management, admission control, or scheduling. Further, the control may be executed in cooperation with a peripheral eNB or core network node. The memory 822 includes a RAM (Random Access Memory) and a ROM (Read Only Memory) and stores a program to be executed by the controller 821 and various kinds of control data (e.g., a terminal list, transmission power data, scheduling data, etc.).

The network interface 823 is a communication interface for connecting the base station apparatus 820 to the core network 824. The controller 821 may communicate with a core network node or another eNB via the network interface 823. In such case, the eNB 800 and the core network node or the other eNB may mutually be connected through a logical interface (e.g., an S1 interface or X2 interface). The network interface 823 may be a wired communication interface or may be a wireless communication interface for a wireless backhaul. In the case where the network interface 823 is a wireless communication interface, the network interface 823 may use, for wireless communication, a frequency band that is higher than a frequency band that is used by the wireless communication interface 825.

The wireless communication interface 825 supports any one of cellular communication schemes such as LTE (Long Term Evolution) and LTE-Advanced and provides wireless connection to a terminal that is positioned in the cell of the eNB 800 via the antennas 810. The wireless communication interface 825 may typically include a baseband (BB) processor 826, an RF circuit 827, and the like. The BB processor 826 may perform encoding/decoding, modulation/demodulation, and multiplexing/demultiplexing, etc., for example, and executes various kinds of signal processing for layers (e.g., L1, MAC, RLC, and PDCP in place of the controller 821, the BB processor 826 may have some or all of the abovementioned logical functions. The BB processor 826 may be a module including a memory that stores a communication control program, a processor that executes the program, and a related circuit. The function of the BB processor 826 may be changed by updating the program. Moreover, the module may be a card or blade that is inserted into a slot of the base station apparatus 820 or may be a chip mounted on the card or blade. Meanwhile, the RF circuit 827 may include a mixer, a filter, an amplifier, and the like and transmits and receives radio signals via the antennas 810.

The wireless communication interface 825 includes a plurality of the BB processors 826, as depicted in FIG. The plurality of BB processors 826 may respectively correspond to a plurality of frequency bands being used by the eNB 800, for example. Further, the wireless communication interface 825 includes a plurality of the RF circuits 827, as depicted in FIG. 8. The plurality of RF circuits 827 may respectively correspond to a plurality of antenna elements, for example. It is to be noted that FIG. 8 depicts an example in which the wireless communication interface 825 includes the plurality of BB processors 826 and the plurality of RF circuits 827, but one BB processor 826 or one RF circuit 827 may be included in the wireless communication interface 825.

In the eNB 800 depicted FIG. 8, one or more components in charge of communication parameter setting and communication processing control may be mounted on the wireless communication interface 825. Alternatively, at least one of these components may be mounted on the controller 821. In one example, a module including a part (e.g., the BB processor 826) or the whole of the wireless communication interface 825 and/or the controller 821 may be mounted on the the eNB 800, and the one or more components may be mounted on the module. In this case, the module stores a program for causing processors to function as the one or more components other words, a program for causing processors to execute operation of the one or more components) and executes the program. In another example, program for causing the processors to function as the one or more components is installed into the eNB 800, and the wireless communication interface 825 (e.g., the BB processor 826) and/or the controller 821 may execute the program. As described so far, the eNB 800, the base station apparatus 820, or the abovementioned module may be provided as an apparatus including the one or more components, and a program for causing processors to function as the one or more components may be provided. In addition, a readable recording medium having the program recorded therein may be provided.

Further, in the eNB 800 depicted in FIG. 8, one or more components for executing processing related to wireless communication may be mounted on the wireless communication interface 825 (e.g., the RF circuit 827).

H-1-2. Second Application Example

FIG. 9 is a block diagram schematically depicting a second example of a configuration of an eNB to which the technology disclosed herein is applicable. An eNB 830 includes one or more antennas 840, a base station apparatus 850, and an RRH 860. Each of the antennas 840 and the RRH 860 are mutually connected via an RF cable. In addition, the base station apparatus 850 and the RRH 860 can mutually be connected via a high-speed line such as an optical fiber cable.

The antennas 840 each have one or more antenna elements (e.g., a plurality of antenna elements constituting a MIMO antenna) and are used for transmission and reception of a radio signal through the RRH 860. The eNB 830 has a plurality of antennas 840, as depicted in FIG. 9, and the plurality of antennas 840 may respectively correspond to a plurality of frequency bands that are used by the eNB 830, for example. It is to be noted that FIG. 9 depicts the example in which the eNB 830 includes the plurality of antennas 840, but the eNB 830 may include a single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 which have been explained with reference to FIG. 8, respectively.

The wireless communication interface 855 supports any one of cellular communication schemes including LTE and LTE-Advanced and provides wireless connection to a terminal positioned in a sector corresponding to the RRH 860, via the RRH 860 and the antennas 840. The wireless communication interface 855 may typically include RB processors 856, etc. The PB processors 856 are similar to the PB processors 826 having been explained with reference to FIG. 8, except for that the PB processors 856 are connected to an RF circuit 864 of the RRH 860 via the connection interface 857. The wireless communication interface 855 includes a plurality of the BB processors 856, as depicted in FIG. 9. The plurality of BB processors 856 may respectively correspond to a plurality of frequency bands being used by the eNB 830, for example. It is to be noted that FIG. 9 depicts an example in which the wireless communication interface 855 includes the plurality of BB processors 856, but the wireless communication interface 855 may include a single BB processor 856.

The connection interface 857 is an interface for connecting the base station apparatus 850 (wireless communication interface 855) to the RRH 860. The connection interface 857 may be a communication module for communication through the high-speed line connecting the base station apparatus 850 (wireless communication interface 855) to the RRH 860. In addition, the PRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication through the high-speed line.

The wireless communication interface 863 transmits and receives radio signals through the antennas 840. The wireless communication interface 863 may typically include the RF circuit 864, etc. The RF circuit 864 may include a mixer, a filter, an amplifier, and the like and transmits and receives a radio signal through the antenna 840. The wireless communication interface 863 may include a plurality of RF circuits 864, as depicted in FIG. 9, and the plurality of RF circuits 864 may respectively correspond to the plurality of antenna elements, for example. It is to be noted that FIG. 9 depicts the example in which the wireless communication interface 863 includes the plurality of RF circuits 864, but the wireless communication interface 863 may include a single RF circuit 864.

In the eNB 830 depicted in FIG. 9, one or more components in charge of communication parameter setting and communication processing control may be mounted on the wireless communication interface 855 and/or the wireless communication interface 863. Alternatively, at least one of these components may ale mounted on the controller 851. In one example, a module including a (e.g., the BB processor 856) or the whole of the wireless communication interface 855 and/or the controller 851 may be mounted on the the eNB 830, and the one or more components may be mounted on the module. In this case, the module stores a program for causing processors to function as the one or more components (in other words, a program for causing processors to execute operation of the one or more components) and executes the program. In another example, a program for causing the processors to function as the one or more components is installed into the eNB 830, and the wireless communication interface 855 (e.g., the BB processor 856) and/or the controller 851 may execute the program. As described so far, the eNB 830, the base station apparatus 850, or the aforementioned module may be provided as an apparatus including the one or more components, and a program for causing processors to function as the one or more components may be provided. In addition, a readable recording medium having the program recorded therein may be provided.

In addition, in the eNB 830 depicted in FIG. 9, one or more components for executing processing related to wireless communication may be mounted on the wireless communication interface 863 (e.g., RF circuit 864).

H-2. Application Example Regarding Terminal Device

H-2-1. First Application Example

Figure 10:
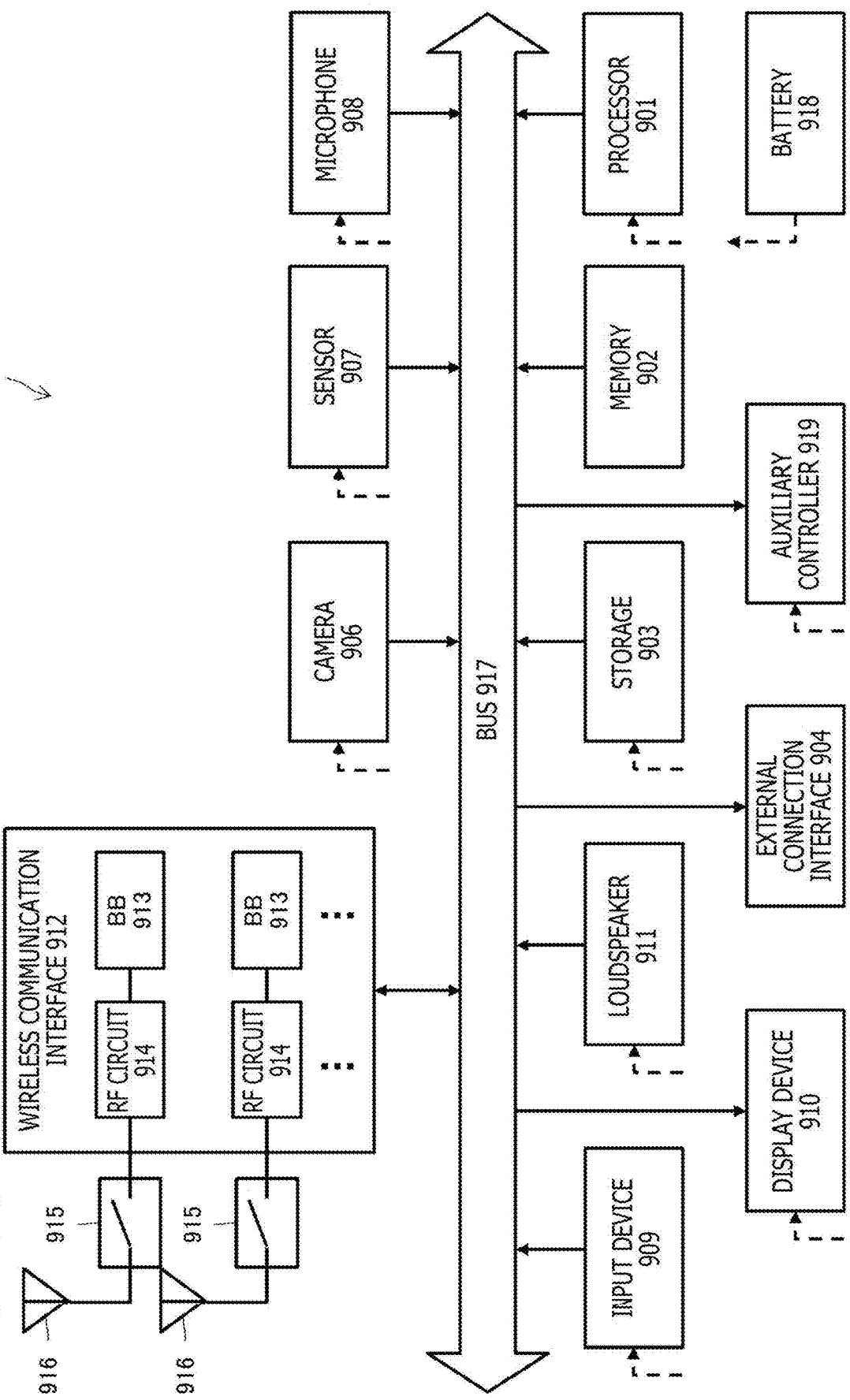
FIG. 10 is a diagram schematically depicting one example of a configuration of a smartphone 900 to which the technology disclosed herein is applicable.

FIG. 10 is a block diagram schematically depicting one example of the configuration of a smartphone 900 to which the technology disclosed herein is applicable. The smartphone 900 includes a processor 901, a memory 902, a storage 903, an external connection interface 904, a camera 906, a sensor 907, a microphone 908, an input device 909, a display device 910, a loudspeaker 911, a wireless communication interface 912, one or more antenna switches 915, one or more antennas 916, a bus 917, a battery 918, and an auxiliary controller 919.

The processor 901 may be a CPU or SoC (System on Chip), for example, and controls the functions of an application layer of the smartphone 900 and other layers. The memory 902 includes a RAM and a ROM and stores data and a program to be executed by the processor 901. The storage 903 can include a recording medium such as a semiconductor memory or a hard disk. The external connection interface 904 is an interface for connecting an external device such as a memory card or a USB (Universal Serial Bus) device to the smartphone 900.

The camera 906 has an imaging element such as a CCD (Charge Coupled Device) or a CMOS (Complementary Metal Oxide Semiconductor), for example, and generates a captured image. The sensor 907 can include a sensor group including a positioning sensor, a gyro sensor, a geomagnetic sensor, an acceleration sensor, etc., for example. The microphone 908 converts a sound inputted to the smartphone 900 to a sound signal. The input device 909 includes a touch sensor for detecting a touch on a screen of the display device 910, a key pad, a keyboard, a button, a switch, or the like, for example, and receives an operation or an information input by a user. The display device 910 has a screen such as a liquid crystal display (LCD) or an organic light emitting diode (OLED) display to display an output image from the smartphone 900. The loudspeaker 911 converts a sound signal outputted from the smartphone 900 to a sound.

The wireless communication interface 912 supports any one of cellular communication schemes including LTE and LTE-Advanced and carries out wireless communication. The wireless communication interface 912 may typically include a BB processor 913, an RF circuit 914, etc. The BB processor 913 may, for example, perform encoding/decoding, modulation/demodulation, multiplexing/demultiplexing, etc., and executes various kinds of signal processing for wireless communication. Meanwhile, the RF circuit 914 may include a mixer, a filter, an amplifier, and the like and transmits and receives radio signals via the antennas 916. The wireless communication interface 912 may be a one-chip module having the PB processor 913 and the RF circuit 914 integrated thereon. The wireless communication interface 912 may include a plurality of the PB processors 913 and a plurality of the RF circuits 914, as depicted in FIG. 10. It is to be noted that FIG. 10 depicts an example in which the wireless communication interface 912 includes a plurality of the BB processors 913 and a plurality of the RF circuits 914, but the wireless communication interface 912 may include a single BB processor 913 or a single RF circuit 914.

Moreover, the wireless communication interface 912 may support not only a cellular communication scheme but also other types of wireless communication schemes such as a short-range wireless communication scheme, a near-field wireless communication scheme, and a wireless LAN (Local Area Network) scheme. In such case, the wireless communication interface 912 may include the BB processors 913 and the RF circuits 914 for the respective wireless communication schemes.

The antenna switches 915 each change the connection destination of the corresponding antenna 916 among plural circuits (e.g., circuits for different wireless communication schemes) included in the wireless communication interface 912.

The antennas 916 each include one or more antenna elements (e.g., a plurality of antenna elements constituting a MIMO antenna) and are used for transmission and reception of radio signals by the wireless communication interface 912. The smartphone 900 may include a plurality of the antennas 916, as depicted in FIG. 10. It is to be noted that FIG. 10 depicts an example in which the smartphone 900 includes a plurality of the antennas 916, but the smartphone 900 may include a single antenna 916.

Further, the smartphone 900 may include the antenna 916 for each wireless communication scheme. In such case, the antenna switch 915 may be omitted from the configuration of the smartphone 900.

The bus 917 mutually connects the processor 901, the memory 902, the storage 903, the external connection interface 904, the camera 906, the sensor 907, the microphone 908, the input device 909, the display device 910, the loudspeaker 911, the wireless communication interface 912, and the auxiliary controller 919. The battery 918 supplies power to the blocks of the smartphone 900 depicted in FIG. 10 via power supply lines partially indicated by broken lines in FIG. 10. The auxiliary controller 919 operates the minimum necessary function of the smartphone 900 during a sleep mode, for example.

In the smartphone 900 depicted FIG. 10, one or more components in charge of reporting measurement to a connected base station and communication processing may be mounted on the wireless communication interface 912. Alternatively, at least one of these components may be mounted on the processor 901 or the auxiliary controller 919. In one example, a module including a part (e.g., the BB processor 913) or the whole of the wireless communication interface 912, the processor 901, and/or the auxiliary controller 919 may be mounted on the smartphone 900, and the one or more components may be mounted on the module. In this case, the module stores a program for causing the processors to function as the one or more components (in other words, a program for causing the processors to execute operation of the one or more components) and executes the program. In another example, a program for causing the processors to function as the one or more components is installed into the smartphone 900, and the wireless communication interface 912 (e.g., the BB processor 913), the processor 901, and/or the auxiliary controller 919 may execute the program. As described so far, the smartphone 900 or the abovementioned module may be provided as an apparatus including the one or more components, and a program for causing the processors to function as the one or more components may be provided. In addition, a readable recording medium having the program recorded therein may be provided.

In addition, in the smartphone 900 depicted in FIG. 10, one or more components that execute wireless communication-related processing may be mounted on the wireless communication interface 912 (e.g., RF circuit 914).

H-2-2. Second Application Example

Figure 11:
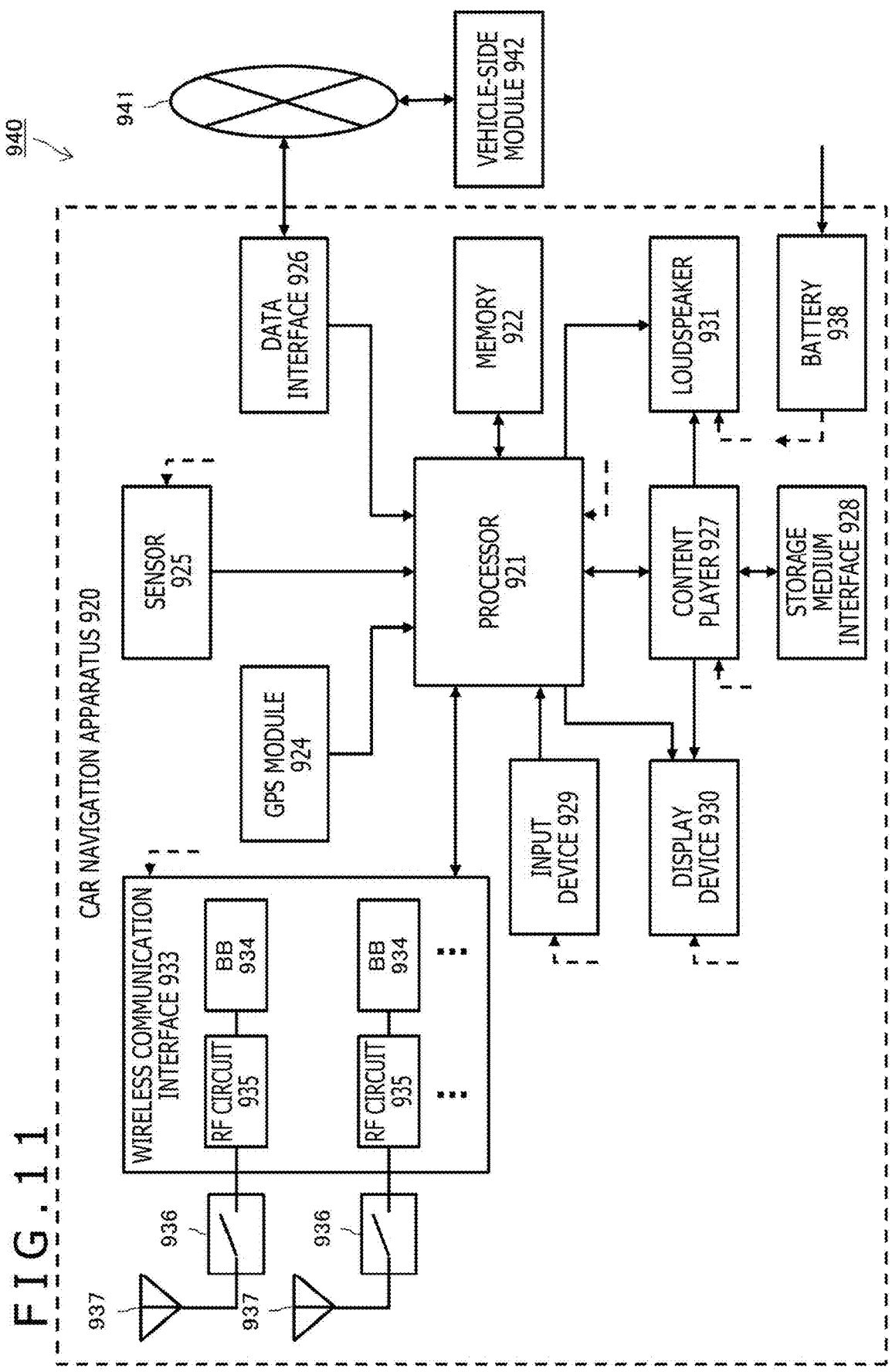
FIG. 11 is a diagram schematically depicting one example of a configuration of a car navigation apparatus 920 to which the technology disclosed herein is applicable.

FIG. 11 is a block diagram schematically depicting one example of a configuration of a car navigation apparatus 920 to which the technology disclosed herein is applicable. The car navigation apparatus 920 includes a processor 921, a memory 922, a GPS (Global Positioning System) module 924, a sensor 925, a data interface 926, a content player 927, a recording medium interface 928, an input device 929, a display device 930, a loudspeaker 931, a wireless communication interface 933, one or more antenna switches 936, one or more antennas 937, and a battery 938.

The processor 921 may a CPU or SoC, for example, and controls the navigation function and the remaining functions of the car navigation apparatus 920. The memory 922 includes a RAM and a ROM to store data and a program to be executed by the processor 921.

The GPS module 924 measures the position (e.g., latitude, longitude, and altitude) of the car navigation apparatus 920 by using a GPS signal received from a GPS satellite. The sensor 925 can include a sensor group including a gyro sensor, a geomagnetic sensor, an atmospheric pressure sensor, etc., for example. The data interface 926 is connected to the on-vehicle network 941 via an unillustrated terminal, for example, and acquires data generated on the vehicle side such as vehicle speed data.

The content player 927 reproduces content stored in a recording medium (e.g., a CD or a DVD inserted the recording medium interface 928. The input device 929 includes a touch sensor for detecting a touch on a screen of the display device 930, a button, a snitch, and the like, for example, and receives an operation or an information input by a user. The display device 930 has a screen such as an LCD or OLEO display and displays an image of the navigation function or an image of content being reproduced. The loudspeaker 931 outputs a sound of the navigation function or a sound of content to be reproduced.

The wireless communication interface 933 supports any one of cellular communication schemes including LTE and LTE-Advanced and carries out wireless communication. The wireless communication interface 933 may typically include a BB processor 934, an RF circuit 935, and the like. The BB processor 934 may perform encoding/decoding, modulation/demodulation, multiplexing/demultiplexing, etc., for example, and executes various kinds of signal processing for wireless communication. Meanwhile, the RF circuit 935 may include a mixer, a filter, an amplifier, and the like and transmits and receives a radio signal via the antenna 937. The wireless communication interface 933 may be a one-chip module on which the BB processor 934 and the RF circuit 935 are integrated. The wireless communication interface 933 may include a plurality of the BB processors 934 and a plurality of the RF circuits 935, as depicted in FIG. 11. It is to be noted that FIG. 11 depicts an example in which the wireless communication interface 933 includes a plurality of the BB processors 934 and a plurality of the RF circuits 935, but the wireless communication interface 933 may include a single BB processor 934 or a single FR circuit 935.

Moreover, the wireless communication interface 933 may support not only a cellular communication scheme but also other types of wireless communication schemes such as a short-range wireless communication scheme, a near-field wireless communication scheme, and a wireless LAN scheme. In such case, the wireless communication interface 933 may include the BB processors 934 and the RF circuits 935 for the respective wireless communication schemes.

The antenna switches 936 each change the connection destinations of the corresponding antennas 937 among plural circuits (e.g., circuits for different wireless communication schemes) included in the wireless communication interface 933.

The antennas 937 each include one or more antenna elements (e.g., a plurality of antenna elements constituting a MIMO antenna) and are used for transmission and reception of radio signals by the wireless communication interface 933. The car navigation apparatus 920 may include a plurality of the antennas 937, as depicted in FIG. 11. It is to be noted that FIG. 11 depicts an example in which the car navigation apparatus 920 includes a plurality of the antennas 937, but the car navigation apparatus 920 may include a single antenna 937.

In addition, the car navigation apparatus 920 may include antennas 937 for the respective wireless communication schemes. In such case, the antenna switches 936 may be omitted from the configuration of the car navigation apparatus 920.

The battery 938 supplies power to each of the blocks of the car navigation apparatus 920 depicted in FIG. 11, via power supply lines which are partially indicated by broken lines in FIG. 11. In addition, the battery 938 stores power supplied from a vehicle side.

In the car navigation apparatus 920 depicted in FIG. 11, one or more components in charge of reporting measurement to a connected base station and communication processing may be mounted on the wireless communication interface 933. Alternatively, at least one of these components may be mounted on the processor 921. In one example, a module including a part (e.g., the BB processor 934) or the whole of the wireless communication interface 933 and/or the processor 921 may be mounted on the car navigation apparatus 920, and the one or more components may be mounted on the module. In this case, the module stores a program for causing processors to function as the one or more components (in other words, a program for causing processors to execute operation of the one or more components) and executes the program. In another example, a program for causing the processors to function as the one or more components is installed into the car navigation apparatus 920, and the wireless communication interface 933 (e.g., the BB processor 934) and/or the processor 921 may execute the program. As described so far, the car navigation apparatus 920 or the aforementioned module may be provided as an apparatus including the one or more components, and a program for causing processors to function as the one or more components may be provided. In addition, a readable recording medium having the program recorded therein may be provided.

Further, in the car navigation apparatus 920 depicted in FIG. 11, one or more components for executing wireless communication-related processing may be mounted on the wireless communication interface 933 (e.g., RF circuit 935).

In addition, the technology disclosed herein may be realized by an on-vehicle system (or vehicle) 940 that includes one or more blocks of the aforementioned car navigation apparatus 920, an on-vehicle network 941, and a vehicle-side module 942. The vehicle-side module 942 generates vehicle-side data such as a vehicle speed, an engine speed, or failure information and outputs the generated data to the on-vehicle network 941.

INDUSTRIAL APPLICABILITY

The details of the technology disclosed herein have been explained above with reference to the specific embodiment. However, it is obvious that a person skilled in the art can make a modification or provide a substitution within the gist of the technology disclosed herein.

In the present description, the embodiment in which the technology disclosed herein is applied to a cellular system has mainly been explained. However, the gist of the technology disclosed herein is not limited to the embodiment. The technology disclosed herein is also applicable to various other wireless communication systems for carrying out full duplex communication.

In brief, the technology disclosed herein has been explained in an exemplified form, and thus, the disclosure herein should not be interpreted in a limited way. To assess the subject the technology disclosed herein, the claims should be taken into consideration.

It is to be noted that the technology disclosed herein may also have the following configurations.

(1)
A communication apparatus including:
a communication section that performs wireless communication; and
a control section that controls operation of the communication section and processing of a signal transmitted and received by the communication section, in which
upon receiving, through a downlink control channel from a base station, designation regarding resource in which interference is to be measured, the control section conducts, in the designated resource, measurement of interference from another terminal.

(2)
The communication apparatus according to (1), in which the control section conducts measurement of interference in a resource that is dynamically designated by a predetermined indicator (Slot Format Indicator: SFI) written in the downlink control channel.

(3)
The communication apparatus according to (1), in which in a case where the downlink control channel through which an instruction for measurement of interference is given does not include identification information regarding the communication apparatus, the control section conducts measurement of interference in the resource designated through the downlink control channel.

(4)
The communication apparatus according to (1), in which in a case where a resource for which an instruction for measurement of interference has been given through the downlink control channel includes a resource semi-statically designated as a downlink, the control section conducts measurement of interference in the resource for which the instruction for measurement of interference has been given.

(5)
The communication apparatus according to (1), in which the control section conducts measurement of interference in a resource that is semi-statically designated as a downlink but is dynamically designated as an uplink while any resource with which full duplex communication is to be carried out is not dynamically designated.

(6)
The communication apparatus according to (5), in which measurement of interference is further conducted in a downlink slot designated by a high-order layer (RRC signaling).

(7)
The communication apparatus according to (1), in which the control section conducts measurement of interference in a downlink resource that is semi-statically designated as an uplink but is dynamically designated as an uplink while any resource with which full duplex communication is to be carried out is not dynamically designated.

(8)
The communication apparatus according to (7) in which measurement of interference is further conducted in an uplink slot designated by a high-order layer (RRC signaling).

(9)
The communication apparatus according to any one of (1) to (8), in which
the control section further controls transmission of interference information obtained by the measurement to the base station.

(10)
The communication apparatus according to (9), in which the control section decides whether or not to transmit the interference information to the other communication apparatus according to whether a quantity of the measured interference is large or small.

(11)
The communication apparatus according to any one of (1) to (10), in which
the control section conducts the measurement of interference on the basis of transmission power of the other terminal.

(12)
The communication apparatus according to (11), in which the control section conducts the measurement of interference on the basis of transmission power of the other terminal dynamically or semi-statically reported from the base station.

(13)
The communication apparatus according to (12), in which the control section conducts the measurement of interference on the basis of transmission power of the other terminal reported from the other terminal and reports the transmission power together with the measured interference information to the base station.

(14)
A communication apparatus including:
a communication section that performs wireless communication; and
a control section that controls operation of the communication section and processing of a signal transmitted and received by the communication section, in which
upon receiving, through a downlink control channel from a base station, designation regarding a resource in which interference is to be measured, the control section conducts, in the designated resource, transmission of a test signal for interference measurement.

(15)
The communication apparatus according to (14), in which the control section transmits a test signal for interference measurement in a resource dynamically designated by a predetermined indicator (Slot Format Indicator: SFI) written in the downlink control channel.

(16)
The communication apparatus according to (14), in which in a case where a downlink control channel through which an instruction for measurement of interference is given includes identification information regarding the communication apparatus, the control section transmits an uplink test signal for interference measurement in the resource designated throng the downlink control channel.

(17)
The communication apparatus according to (14), in which in a case where a resource for which an instruction for measurement of interference has been given through a downlink control channel includes a resource semi-statically designated as an uplink, the control section conducts transmission of an uplink test signal for interference measurement.

(18)
The communication apparatus according to (14), in which the control section conducts transmission of a test signal for interference measurement in a downlink resource that is semi-statically designated as a downlink but is dynamically designated as an uplink while any resource with which full duplex communication is to be carried out is not dynamically designated.

(19)
The communication apparatus according to (18), in which transmission of a test signal for interference measurement is further conducted in a downlink slot designated by a high-order layer (RRC signaling).

(20)
The communication apparatus according to (14), in which the control section conducts transmission of a test signal for interference measurement in a downlink resource that is semi-statically designated as an uplink but is dynamically designated as an uplink while any resource with which full duplex communication is to be carried out is not dynamically designated.

(21)
The communication apparatus according to (20), in which transmission of a test signal for interference measurement is further conducted in an uplink slot designated by a high-order layer (RRC signaling).

(22)
The communication apparatus according to (14), in which the control section conducts transmission of a test signal for interference measurement by using transmission power dynamically or semi-statically reported from the base station.

(23)
The communication apparatus according to (14), in which the control section conducts transmission of a test signal for interference measurement in a resource dynamically or semi-statically reported from the base station and reports information regarding transmission power of the test signal to the base station.

(24)
The communication apparatus according to (14), in which the control section controls transmission power of an uplink signal on the basis of information regarding transmission power reported from the base station.

(25)
A communication apparatus including;
a communication section that performs wireless communication; and
a control section that controls operation of the communication section and processing of a signal transmitted and received by the communication section, in which
the control section makes, through a downlink control channel, designation regarding a resource in which interference is to be measured, for a downlink terminal that is slated to transmit a downlink signal.

(26)
The communication apparatus according to (25), in which the control section makes, through a downlink control channel, designation regarding a resource in which a test signal for interference measurement is to be transmitted, for an uplink terminal that is slated to transmit an uplink signal.

(27)
The communication apparatus according to (25), in which the control section dynamically designates a resource in which measurement of interference is to be conducted, by using a predetermined indicator (Slot Format Indicator: SFI) written in the downlink control channel.

(28)
The communication apparatus according to (25), in which the control section includes, in a downlink control channel through which an instruction for measurement of interference is given, identification information regarding a terminal that is to transmit a test signal for interference measurement but does not include, in the downlink control channel, identification information regarding a terminal that is to measure interference on the basis of the test signal.

(29)
The communication apparatus according to (25), in which the control section
designates, for an uplink terminal, a resource semi-statically designated as a downlink through a downlink control channel and gives an instruction for transmission of an uplink signal in the resource, and
designates, for a downlink terminal, a resource semi-statically designated as a downlink through the downlink control channel and gives an instruction for measurement of interference on the uplink signal in the resource.

(30)
The communication apparatus according to (25), in which the control section does not dynamically give an instruction for carrying out full duplex communication to a terminal but gives, to the terminal, an instruction for measurement of interference in a downlink resource that is semi-statically designated as a downlink but is dynamically designated as an uplink.

(31)
The communication apparatus according to (30), in which an instruction for measurement of interference is further given to the terminal in a downlink slot designated by a high-order layer (RRC signaling).

(32)
The communication apparatus according to (25), in which the control section does not dynamically give an instruction to carry out full duplex communication to a terminal but gives, to the terminal, an instruction for measurement of interference in an uplink resource that is semi-statically designated as an uplink but is dynamically designated as a downlink.

(33)
The communication apparatus according to (32), in which an instruction for measurement of interference is further given to the terminal in an uplink slot designated by a high-order layer (RRC signaling).

(34)
The communication apparatus according to (25), in which the control section decides, on the basis of interference measurement result obtained by a downlink terminal, a combination of a downlink terminal to be set as a transmission destination of a downlink signal and an uplink terminal to transmit an uplink signal in the resource for which the instruction for measurement of interference has been given through the downlink control channel.

(35)
The communication apparatus according to (25), in which the control section dynamically or semi-statically designates transmission power of a test signal for interference measurement.

(36)
The communication apparatus according to (25), in which the control section controls transmission power of a downlink signal to be transmitted simultaneously with an uplink signal from an uplink terminal, in the resource for which the instruction for measurement of interference has been given through the downlink control channel.

(37)
A communication method including:
a step of receiving, through a downlink control channel from a base station, designation regarding a resource in which interference is to be measured; and a step of conducting measurement of interference from another terminal in the designated resource.

(38)

A communication method including:

a step of receiving, through a downlink control channel from a base station, designation regarding a resource in which interference is to be measured; and a step of transmitting a test signal for measurement of interference from another terminal in the designated resource.

(39)

A communication method including:

a step of transmitting, through a downlink control channel to a downlink terminal that is slated to transmit a downlink signal, designation regarding a resource in which interference is to be measured;

a step of transmitting, through the downlink control channel to an uplink terminal that is slated to transmit an uplink signal, designation regarding a resource in which a test signal for interference measurement is to be transmitted; and a step of deciding, on the basis of an interference measurement result obtained by the downlink terminal, a combination of a downlink terminal to be set as a transmission destination of a downlink signal and an uplink terminal to transmit an uplink signal in the resource for which an instruction for measurement of interference has been given through the downlink control channel.

REFERENCE SIGNS LIST

800 . . . eNB, 810 . . . Antenna
820 . . . Base station apparatus, 821 . . . Controller, 822 . . . Memory
823 . . . Network interface, 824 . . . Core network
825 . . . Wireless interface, 826 . . . Baseband processor
827 . . . RF circuit
830 . . . eNB, 840 . . . Antenna
850 . . . Base station apparatus, 851 . . . Controller, 852 . . . Memory
853 . . . Network interface, 584 . . . Core network
855 . . . Wireless communication interface, 856 . . . Baseband processor
857 . . . Connection interface
860 . . . BRH, 861 . . . Connection interface
863 . . . Wireless communication interface, 864 . . . RF circuit
900 . . . Smartphone, 901 . . . Processor, 902 . . . Memory
903 . . . Storage, 904 . . . External connection
906 . . . Camera, 907 . . . Sensor, 908 . . . Microphone
909 . . . Input device, 910 . . . Display device, 911 . . . Loudspeaker
912 . . . Wireless communication interface, 913 . . . Baseband processor
914 . . . RF circuit, 915 . . . Antenna switch, 916 . . . Antenna
917 . . . Bus, 918 . . . Battery, 919 . . . Auxiliary controller
920 . . . Car navigation apparatus
921 . . . Processor, 922 . . . Memory, 924 . . . GPS module
925 . . . Sensor, 926 . . . Data interface
927 . . . Content player, 928 . . . Recording medium interface
929 . . . Input device, 930 . . . Display device, 931 . . . loudspeaker
933 . . . Wireless communication interface, 934 . . . Baseband processor
935 . . . RE circuit, 936 . . . Antenna switch, 937 . . . Antenna
938 . . . Battery
940 . . . On-vehicle system (or vehicle)
941 . . . Core network, 942 . . . Vehicle-side module

The invention claimed is:

1. A communication apparatus, comprising:
circuitry configured to:
receive a signal via wireless communication;
process the received signal;
receive, via a downlink control channel, designation information associated with designation of a resource in which interference is to be measured, wherein
the designation information is received from a base station, and
the interference is from a terminal different from the communication apparatus; and
measure, in the designated resource, the interference from the terminal based on:
the received designation information of the resource, and
transmission power, of the terminal, one of dynamically or semi-statically reported from the base station.

2. The communication apparatus according to claim 1, wherein
the circuitry is further configured to measure the interference in a resource that is dynamically designated by a determined indicator (Slot Format Indicator: SFI) written in the downlink control channel.

3. The communication apparatus according to claim 1, wherein
in a case where the downlink control channel through which an instruction for the measurement of the interference is given does not include identification information associated with the communication apparatus, the circuitry is further configured to measure the interference in the resource designated through the downlink control channel.

4. The communication apparatus according to claim 1, wherein
in a case where a resource for which an instruction for the measurement of the interference has been given through the downlink control channel includes a resource semi-statically designated as a downlink, the circuitry is further configured to measure the interference in the resource for which the instruction for the measurement of the interference has been given.

5. The communication apparatus according to claim 1, wherein
the circuitry is further configured to measure the interference in a downlink resource that is semi-statically designated as a downlink and is dynamically designated as an uplink when a specific resource with which full duplex communication is to be carried out is not dynamically designated.

6. The communication apparatus according to claim 5, wherein
the circuitry is further configured to measure the interference in a downlink slot designated by a high-order layer (RRC signaling).

7. The communication apparatus according to claim 1, wherein
the circuitry is further configured to measure the interference in a downlink resource that is semi-statically designated as an uplink and is dynamically designated as the uplink when a specific resource with which full duplex communication is to be carried out is not dynamically designated.

8. The communication apparatus according to claim 7, wherein
the circuitry is further configured to measure the interference in an uplink slot designated by a high-order layer (RRC signaling).

9. The communication apparatus according to claim 1, wherein
the circuitry is further configured to control transmission of interference information obtained by the measurement to the base station.

10. The communication apparatus according to claim 9, wherein
the circuitry is further configured to decide whether to transmit the interference information to a specific communication apparatus based on a quantity of the measured interference that is one of large or small.

11. The communication apparatus according to claim 1, wherein the circuitry is further configured to:
measure the interference based on the transmission power of the terminal reported from the terminal; and
report the transmission power with the measured interference to the base station.

12. A communication apparatus, comprising:
circuitry configured to:
receive a signal via wireless communication;
process the received signal
receive, via a downlink control channel, designation information associated with designation of a resource in which interference is to be measured, wherein
the designation information is received from a base station, and
the interference is from a terminal different from the communication apparatus; and
transmit, in the designated resource a test signal for measurement of the interference to the terminal based on:
the received designation information of the resource; and
transmission power of the test signal one of dynamically or semi-statically reported from the base station.

13. The communication apparatus according to claim 12, wherein
the circuitry is further configured to transmit the test signal for the measurement of the interference in a resource that is dynamically designated by a determined indicator (Slot Format Indicator: SFI) written in the downlink control channel.

14. The communication apparatus according to claim 12, wherein
in a case where the downlink control channel through which an instruction for the measurement of the interference is given includes identification information regarding the communication apparatus, the circuitry is further configured to transmit an uplink test signal for the measurement of the interference in the resource designated through the downlink control channel.

15. The communication apparatus according to claim 12, wherein
in a case where a resource for which an instruction for the measurement of the interference has been given through the downlink control channel includes a resource semi-statically designated as an uplink, the circuitry is further configured to transmit an uplink test signal for the measurement of the interference.

16. The communication apparatus according to claim 12, wherein
the circuitry is further configured to transmit the test signal for the measurement of the interference in a downlink resource that is semi-statically designated as a downlink and is dynamically designated as an uplink when a specific resource with which full duplex communication is to be carried out is not dynamically designated.

17. The communication apparatus according to claim 16, wherein
the circuitry is further configured to transmit the test signal for the measurement of the interference in a downlink slot designated by a high-order layer (RRC signaling).

18. The communication apparatus according to claim 12, wherein
the circuitry is further configured to transmit the test signal for the measurement of the interference in a downlink resource that is semi-statically designated as an uplink and is dynamically designated as the uplink when a specific resource with which full duplex communication is to be carried out is not dynamically designated.

19. The communication apparatus according to claim 18, wherein
the circuitry is further configured to transmit the test signal for the measurement of the interference in an uplink slot designated by a high-order layer (RRC signaling).

20. The communication apparatus according to claim 12, wherein the circuitry is further configured to:
transmit the test signal for the measurement of the interference in one of a resource dynamically or semi-statically reported from the base station; and
report information regarding the transmission power of the test signal to the base station.

21. The communication apparatus according to claim 12, wherein
the circuitry is further configured to control transmission power of an uplink signal based on information regarding the transmission power reported from the base station.

22. A communication apparatus, comprising:
circuitry configured to:
receive a signal via wireless communication;
process the received signal;
control, via a downlink control channel, designation information associated with designation of a resource in which interference is to be measured, for a downlink terminal that is slated to transmit a downlink signal; and
designate transmission power of a test signal one of dynamically or semi-statically for measurement of the interference.

23. The communication apparatus according to claim 22, wherein
the circuitry is further configured to control, via the downlink control channel, the designation information associated with the designation of the resource in which the test signal for the measurement of the interference is to be transmitted, for an uplink terminal that is slated to transmit an uplink signal.

24. The communication apparatus according to claim 22, wherein
the circuitry is further configured to dynamically designate the resource in which the measurement of the interference is to be conducted based on a determined indicator (Slot Format Indicator: SFI) written in the downlink control channel.

25. The communication apparatus according to claim 22, wherein
the circuitry is further configured to include, in the downlink control channel through which an instruction for the measurement of the interference is given, identification information regarding a first terminal that is to transmit the test signal for the measurement of the interference and does not include, in the downlink control channel, identification information regarding a second terminal that is to measure the interference based on the test signal.

26. The communication apparatus according to claim 22, wherein the circuitry is further configured to:
designate, for an uplink terminal, a resource semi-statically designated as a downlink through the downlink control channel;
give an instruction for transmission of an uplink signal in the resource that is semi-statically designated;
designate, for the downlink terminal, the resource semi-statically designated as the downlink through the downlink control channel; and
give an instruction for the measurement of the interference on the uplink signal in the resource that is semi-statically designated.

27. The communication apparatus according to claim 22, wherein
the circuitry is further configured not to dynamically give an instruction for full duplex communication to a terminal and give, to the terminal, an instruction for the measurement of the interference in a downlink resource that is semi-statically designated as a downlink and is dynamically designated as an uplink.

28. The communication apparatus according to claim 27, wherein
the instruction for the measurement of the interference is further given to the terminal in a downlink slot designated by a high-order layer (RRC signaling).

29. The communication apparatus according to claim 22, wherein
the circuitry is further configured not to dynamically give an instruction for full duplex communication to a terminal and give, to the terminal, an instruction for the measurement of the interference in an uplink resource that is semi-statically designated as an uplink and is dynamically designated as a downlink.

30. The communication apparatus according to claim 29, wherein
the instruction for the measurement of the interference is further given to the terminal in an uplink slot designated by a high-order layer (RRC signaling).

31. The communication apparatus according to claim 22, wherein
the circuitry is further configured to decide, based on a measurement result obtained by the downlink terminal, a combination of the downlink terminal to be set as a transmission destination of the downlink signal and an uplink terminal to transmit an uplink signal in the resource for which an instruction for the measurement of the interference has been given through the downlink control channel.

32. The communication apparatus according to claim 22, wherein
the circuitry is further configured to control transmission power of the downlink signal to be transmitted simultaneously with an uplink signal from an uplink terminal, in a resource for which an instruction for the measurement of the interference has been given through the downlink control channel.

33. A communication method, comprising:
in a communication apparatus:
receiving, via a downlink control channel, designation information associated with designation of a resource in which interference is to be measured, wherein
the designation information is received from a base station, and
the interference is from a terminal different from the communication apparatus; and
measuring, in the designated resource, the interference from the terminal based on:
the received designation information of the resource, and
transmission power, of the terminal, one of dynamically or semi-statically reported from the base station.

34. A communication method, comprising:
in a communication apparatus:
receiving, via a downlink control channel, designation information associated with designation of resource in which interference is to be measured, wherein
the designation information is received from a base station, and
the interference is from a terminal different from the communication apparatus; and
transmitting, in the designated resource, a test signal for measurement of the interference to the terminal based on:
the received designation information of the resource, and
transmission power of the test signal one of dynamically or semi-statically reported from the base station.

35. A communication method, comprising:
in a communication apparatus:
transmitting, via a downlink control channel to a downlink terminal, designation information associated with designation of a resource in which interference is to be measured, wherein the downlink terminal is slated to transmit a downlink signal;
transmitting, via the downlink control channel to an uplink terminal, designation information associated with designation of a resource in which a test signal for measurement of the interference is to be transmitted, wherein the uplink terminal is slated to transmit an uplink signal; and
deciding, based on of an interference measurement result obtained by the downlink terminal, a combination of the downlink terminal to be set as a transmission destination of the downlink signal and the uplink terminal to transmit the uplink signal in the resource for which an instruction for the measurement of the interference is given through the downlink control channel.

* * * * *